United States Patent
Priestas et al.

(10) Patent No.: US 10,796,080 B2
(45) Date of Patent: Oct. 6, 2020

(54) ARTIFICIAL INTELLIGENCE BASED DOCUMENT PROCESSOR

(71) Applicant: ACCENTURE GLOBAL SOLUTIONS LIMITED, Dublin (IE)

(72) Inventors: James R. Priestas, Arlington, VA (US); Tara Lynn O'Gara, Chicago, IL (US); Theresa M. Gaffney, Milton, MA (US); Sarat Gurram, Bangalore (IN); Travis James Bowers, Cambridge, MA (US); Medb Corcoran, Clontarf (IE); Bogdan Eugen Sacaleanu, Dublin (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 211 days.

(21) Appl. No.: 16/179,448

(22) Filed: Nov. 2, 2018

(65) Prior Publication Data

US 2019/0087395 A1     Mar. 21, 2019

Related U.S. Application Data

(63) Continuation-in-part of application No. 15/922,567, filed on Mar. 15, 2018, now Pat. No. 10,489,502.
(Continued)

(51) Int. Cl.
*G06F 40/20* (2020.01)
*G06F 40/169* (2020.01)
(Continued)

(52) U.S. Cl.
CPC .......... *G06F 40/169* (2020.01); *G06F 16/288* (2019.01); *G06F 40/117* (2020.01);
(Continued)

(58) Field of Classification Search
CPC ................. G06F 40/20; G06F 40/35
See application file for complete search history.

(56) References Cited

U.S. PATENT DOCUMENTS

| | | | |
|---|---|---|---|
| 6,014,680 A * | 1/2000 | Sato | G06F 40/14 |
| | | | 715/234 |
| 6,778,979 B2 | 8/2004 | Grefenstette et al. | |

(Continued)

FOREIGN PATENT DOCUMENTS

| | | |
|---|---|---|
| CA | 2831300 | 3/2012 |
| EP | 2343670 | 7/2011 |

(Continued)

*Primary Examiner* — Daniel Abebe
(74) *Attorney, Agent, or Firm* — Mannava & Kang, P.C.

(57) ABSTRACT

An Artificial Intelligence (AI) based document processing system receives a request including one or more documents related to a process to be automatically executed. The information including the fields and an intent required for the process are extracted from one or more of the request and the documents. The required documents and fields are selected based on the intent and a domain model. The required fields are validated using external knowledge and the discrepancies identified therein are resolved. An internal master document is built based on the required fields. The internal master document is employed for the automatic execution of the process.

20 Claims, 18 Drawing Sheets

Related U.S. Application Data which is a continuation-in-part of application No. 15/879,031, filed on Jan. 24, 2018.

(60) Provisional application No. 62/674,367, filed on May 21, 2018, provisional application No. 62/527,441, filed on Jun. 30, 2017.

(51) Int. Cl.
   *G06F 40/30*    (2020.01)
   *G06F 40/117*   (2020.01)
   *G06F 40/295*   (2020.01)
   *G06N 20/00*    (2019.01)
   *G06F 16/28*    (2019.01)
   *G06K 9/00*     (2006.01)

(52) U.S. Cl.
   CPC ............ *G06F 40/295* (2020.01); *G06F 40/30* (2020.01); *G06K 9/00456* (2013.01); *G06N 20/00* (2019.01)

(56) References Cited

U.S. PATENT DOCUMENTS

| | | |
|---|---|---|
| 7,117,432 B1 | 10/2006 | Shanahan et al. |
| 8,429,179 B1 | 4/2013 | Mirhaji |
| 9,734,289 B2 | 8/2017 | Pecora |
| 2002/0103834 A1* | 8/2002 | Thompson ............... G06K 9/03 715/256 |
| 2003/0061201 A1 | 3/2003 | Grefenstette et al. |
| 2005/0108001 A1 | 5/2005 | Aarskog |
| 2006/0020466 A1 | 1/2006 | Cousineau et al. |
| 2006/0104511 A1 | 5/2006 | Guo et al. |
| 2009/0012842 A1 | 1/2009 | Srinivasan et al. |
| 2010/0174732 A1 | 7/2010 | Levy et al. |
| 2010/0293451 A1 | 11/2010 | Carus |
| 2017/0236154 A1 | 8/2017 | Purves |
| 2018/0046764 A1 | 2/2018 | Katwala et al. |
| 2019/0019022 A1* | 1/2019 | Marda ............... G06K 9/00483 |
| 2019/0005012 A1 | 3/2019 | Priestas |
| 2019/0236102 A1* | 8/2019 | Wade .................... G06F 16/901 |

FOREIGN PATENT DOCUMENTS

| | | |
|---|---|---|
| EP | 3422202 | 1/2019 |
| JP | 2005-050245 | 2/2005 |
| JP | 2006-079189 | 3/2006 |
| JP | 2009-223662 | 10/2009 |
| JP | 2010-140457 | 6/2010 |
| JP | 2015-143906 | 8/2015 |
| WO | 02/056196 | 7/2002 |
| WO | 2009/006609 | 1/2009 |
| WO | 2017/139499 | 8/2017 |

\* cited by examiner

| # | Type | Input | Process | Output | Example |
|---|---|---|---|---|---|
| 1 | | Text value | Directly pass to output | Same text value | Accenture |
| 2 | | Text value | Regex validation | Same text value or value in an updated format | e.g., date, account number |
| 3 | Controlled | Single value from a set | Validation against a pre-defined set of values | Same value or resolution is required (if value doesn't match the allowed set) | US States |
| 4 | | Values from a set that combine to create a unique value | Validation against a pre-defined set of values and also cross validation of values | Same value or resolution is required (if value doesn't match the allowed set) | Some benefits may be per month while others must be per annum |
| 5 | | Phrase | Validation against a pre-defined set of values | Same value or resolution is required (if value doesn't match the allowed set) | Some of the in/out of network comments we see could be pre-defined. |
| 6 | Freetext | Presence of a piece of text | Derive Yes/No<br>Derive a different value<br>Copy the provided value | Yes/No<br>Included/Excluded, Controlled set (e.g., a % or $ amount) | Lifestyle Management Programs: Stress Management, Tobacco Cessation and Weight Management - the presence of these programs indicates their inclusion in the plan |
| 7 | | Semantic check of the meaning of text | Derive Yes/No<br>Derive a different value<br>Copy the provided value | Yes/No<br>Included/Excluded, Controlled set (e.g., a % or $ amount) | Subject to Penalty [...] 50% penalty applied to hospital inpatient changes for failure to contact Cigna Healthcare |
| 8 | ??? | | Derived, copied, or a summary | Large section of text | |

FIG. 5

| # | Comparison Type | Example |
|---|---|---|
| 1 | Direct/Identical match | Accenture v Accenture |
| 2 | Identical match minus punctuation and cases | Accenture v accenture |
| 3 | Set comparison | State comparison |
| 4 | Range comparison | 0-100% |
| 5 | Fuzzy match | John H. Smith v John Smith |
| 6 | Synonyms | Hearing aid v Hearing device |
| 7 | Abbreviations | Rehab. v Rehabilitation |
| 8 | Presence of terms (substring match) | Both Opposite and Same Sex Domestic Partners v Domestic Partners |
| 9 | Comparison of derived values | 50% penalty applied v Penalty Percent |

FIG. 17

ARTIFICIAL INTELLIGENCE BASED DOCUMENT PROCESSOR

PRIORITY

This application claims priority to the U.S. Provisional patent application no. 62/674,367, filed on May 21, 2018, and is a continuation-in-part of U.S. Non-provisional application 15/922,567, which was filed on Mar. 15, 2018, which is a continuation-in-part of U.S. Non-provisional application serial no. 15/879,031 filed on Jan. 24, 2018, which in turn claims the benefit of U.S. provisional application serial no. 62/527,441, filed on Jun. 30, 2017, the disclosures of these applications are expressly incorporated herein by reference in their entireties.

BACKGROUND

Forms or documents of various types are widely used for collecting information for various purposes. Medical, commercial, educational and governmental organizations use documents of various formats for collecting information and for record keeping purposes. The advent of computers and communication networks resulted in the documents being moved online so that people no longer have to fill out forms on paper. In addition, digitized records, including electronic and scanned copies of paper documents, are now generated using computers. These electronic documents are shared over the communication networks thereby saving time and resources that may be otherwise required for generating and exchanging paper documents.

These documents may contain data in structured and unstructured formats. A structured document can have embedded code which enables arranging the information in a specified format. Unstructured documents include free form arrangements, wherein the structure, style and content of information in the original documents may not be preserved. It is not uncommon for record-keeping entities to create and store large unstructured electronic documents that may include content from multiple sources.

Often, various enterprise systems wish to utilize information from electronic documents to perform operations. It is relatively easy to programmatically extract information from structured documents that have a well-defined or organized data model, such as extracting data from fields in a form where the fields are at a known location in the form (e.g., data in a tabular arrangement). However, when the electronic documents include large unstructured documents, such as the type of unstructured document discussed above, it is technically difficult to extract information that may be needed to perform operations of enterprise systems or other types of systems. Unstructured documents often do not have well-defined data models, making it difficult to reliably programmatically parse and extract the needed information from the documents.

BRIEF DESCRIPTION OF DRAWINGS

Features of the present disclosure are illustrated by way of examples shown in the following figures. In the following figures, like numerals indicate like elements, in which:

FIG. 5 shows a tabular form of example validations associated with various fields extracted during the document processing in accordance with the examples disclosed herein.

FIG. 6 shows a tabular form of example matches that can occur between various values.

FIG. 15 shows a GUI including an EHR of a patient that is displayed by the document processing system in accordance with the examples disclosed herein.

FIG. 16 shows a GUI with a portion of the EHR that is displayed when an 'H' tab corresponding to the medical history is selected in accordance with the examples disclosed herein.

FIG. 17 shows a GUI that enables a user to sign off on a portion of the EHR such as in accordance with the examples disclosed herein.

DETAILED DESCRIPTION

Figure 1:
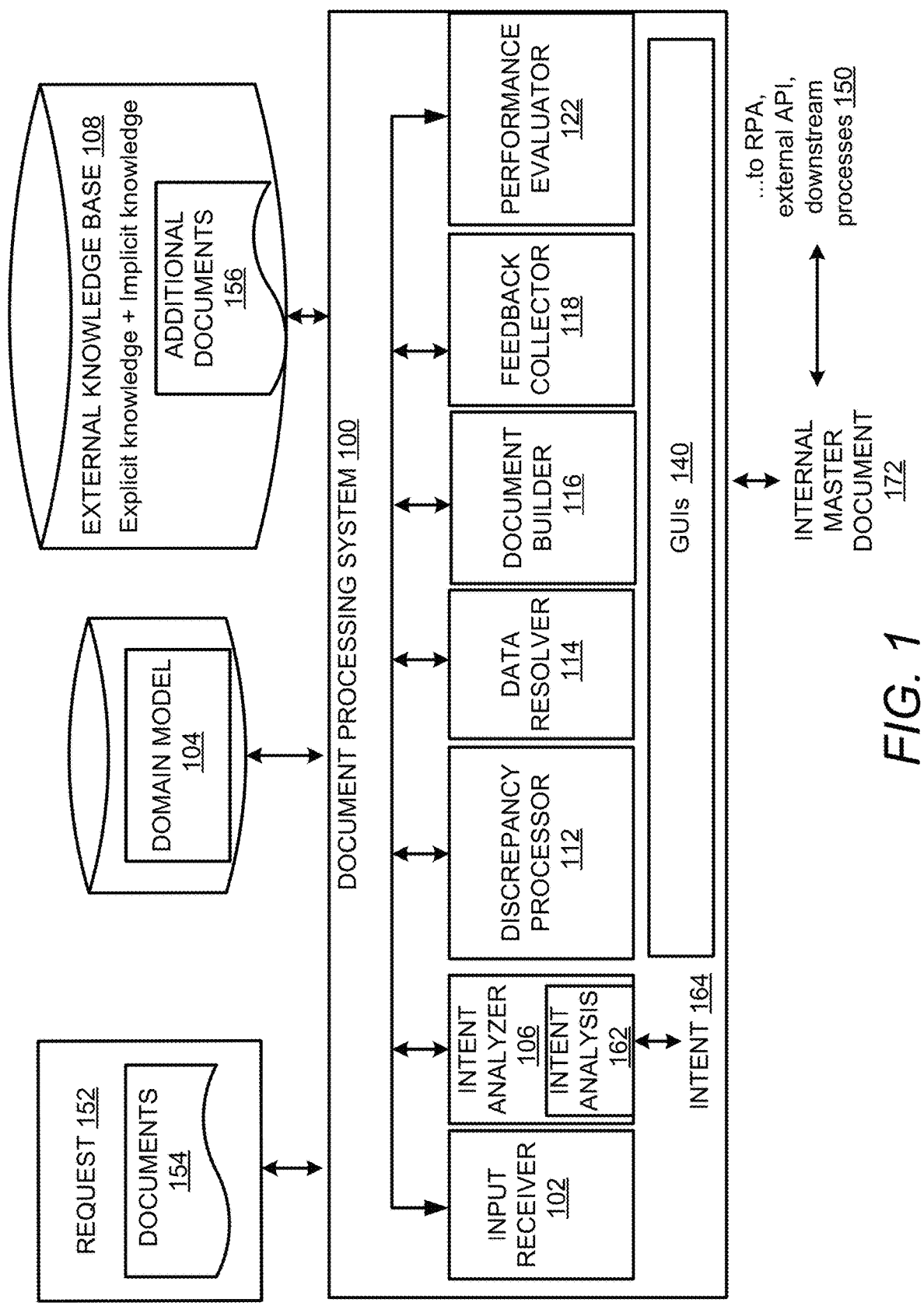
FIG. 1 shows a block diagram of an Artificial Intelligence (AI)-based document processing system in accordance with the examples disclosed herein.

For simplicity and illustrative purposes, the present disclosure is described by referring mainly to examples thereof. In the following description, numerous specific details are set forth to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a document processing system is described which processes electronic documents such as, but not limited to, structured and unstructured documents to extract required information and enable automatic execution of processes based on the extracted information. The extracted information can be used to build internal master documents which further enable generating forms, contracts and the like during the automatic execution of the processes. The document processing system can also be configured for discrepancy resolution so that any discrepancies identified during the document processing can be automatically resolved based on various information sources available to the document processing system. If the document processing system fails to automatically resolve the discrepancy then such fields can be flagged for human review.

The document processing system employs a machine learning (ML) based domain model which can include domain-specific terminology, definitions of industry terms including the possible fields of various data types that may be included in the documents received for processing at the document processing system. Accordingly, automatic execution of processes from various domains that require the identification of specific key-value pairs within a document (e.g., insurance, customer care, banking, telecoms, etc.) is enabled based on the particular domain model employed by the document processing system. An intent is identified by the document processing system from a request that can include one or more documents. The intent can be an identifier or other indicator of an automatically executed process that the document processing system enables in response to receiving the request. The intent can be further processed via employing the domain model and one or more other data sources including external knowledge bases. Based on the identified intent, a document may be processed via one or more different process streams. Accordingly, different input fields may be extracted and identified using the domain model and different internal master documents can be built based on a selected process stream. Correspondingly, the discrepancy resolutions and the user interfaces (UIs) employed to present the information from the document processing system may also differ based on the process streams.

Technical improvements of the document processing system include inter alia effectively converting documents of different formats into homogenous documents via optical character recognition (OCR), improving the precision of the desired information that is extracted and compared from the documents, automatic resolution of discrepancies using AI techniques and automatic execution of the downstream processes via building the internal master documents. The documents processed may further contain one or more of structured and unstructured component documents of different formats some of which may include typed textual data while others may include handwritten text and some of the data may be presented as tables, graphs or other non-textual formats. The document processing system can analyze such heterogeneous documents having a range of varying formats to identify, and compare information presented therein. The data transformations from other formats to textual data types using optical character recognition (OCR) and/or AI techniques represent technical improvements as they allow not only dynamic presentation of the data from non-editable image files but also enable robotic process automation (RPA) via building internal master documents from the extracted/processed data. Automating downstream processes improve the speed and accuracy of not only the document processing system (which may implement such automated processes) but also other external computing systems which are now able to consume data directly as homogenous internal master documents as opposed to extracting data from non-homogenous data sources such as the documents of different data formats that may have been initially received by the document processing system. The techniques discussed herein are applicable irrespective of the systems currently employed to execute the automated processes. The document processing system can be designed to be legacy system agnostic and provides for automation and AI support by leveraging data that is already being passed between workflow processes which implies minimal or no requirements for legacy system integration.

FIG. 1 shows a block diagram of an AI-based document processing system 100 in accordance with an example. The document processing system 100 receives electronic documents in structured or unstructured formats either as machine-readable files or as image files and processes the electronic documents to identify or interpret an intent 164 conveyed in one or more of the electronic documents. The documents are processed based on the intent 164 to generate one or more internal master documents that can be further employed in downstream processes within the document processing system 100 or other external systems 150.

The document processing system 100 includes an input receiver 102 that receives a request 152 for automatic execution of one or more processes. The request 152 can be received in different modalities including by not limited to communication channels such as emails or as input from other systems via direct file transfers and the like. The request 152 which pertains to a particular automated process can be received at a particular component of a network. For example, if the request 152 pertains to claims processing request, then the email including the request 152 can be received at a claims inbox thereby indicating that an automated claims process is to be initiated in response to the request 152. The request 152 can further include information such as electronic documents 154 necessary for the document processing system 100 to identify the process to be automatically executed. The request 152 when received in an email may include the additional documents 154 as attachments to be processed for extracting the information necessary for the intent identification.

Various processes and data will be described herein in terms of examples pertaining to the healthcare domain but it can be appreciated that the examples are only given by way of illustration. The document processing system 100 can be therefore be similarly configured to automate processes within various domains based at least on implementation of different domain models in accordance with examples disclosed herein. Some example downstream processes that are automated using the document processing system 100 can include, but are not limited to, risk adjustment, utilization management, intelligent benefits, intelligent enrollment, provider data management, provider credentialing and the like which can include automated data identification, categorization, analysis and generation of recommendations. Each of these processes will be discussed as examples herein below in order to illustrate the technical advantages afforded by the document processing system 100. Each process can employ a version of the domain model 104 that is customized to that particular process. The customization of the domain model 104 can encompass inclusion of domain-specific information such as the various parameters, hyper-parameters, name-value pairs and the like the details of which will be discussed herein.

One such example process discussed is intelligent benefits. Each year when millions of workers apply for renewing their health insurance and pharmacy benefits, the bulk of the requests come at particular times of the year, for example, from September through December. However, prior to being able to handle the renewal requests or other changes, the computing systems associated with the insurance processes need to be updated. Benefits evolve annually based on various conditions such as healthcare delivery costs, drug prices, compliance with federal or state insurance regulations and the like. Accordingly, the computing systems handling insurance processes may require that benefits structures be created or rebuilt and updated to reflect changes in coverage, costs, persons covered, regulations and the like. The United States has approximately 1.5 million individual providers (primary care physicians, specialists, nurse practitioners, dentists, social workers etc.) and 6000+ facilities that must provide demographic and license information to each healthcare plan they are contracted with in order to be reimbursed for claims. Today, no industry mandated, standard, transaction format exists for this data resulting in very manual, labour-intensive processes that are time-consuming and error prone as millions of structured and unstructured documents are to be reviewed each year for the procedures. Each update for a single renewal transaction can take 4-24 hours with additional time for resolving discrepancies as the computing systems are not configured to handle discrepancies. For example, a transaction may require review and comparison of approximately 600 fields within the benefits structures for the updates. Some transactions can require review, interpretation and validation of more than 10 forms which can include documents as varied as, electronic health records (EHRs), receipts, licenses, medical degrees, specialization certificates and the like.

The information required to identify the intent of a given document and execute an automatic process can include various fields that are extracted in terms of name-value pairs from the request 152. In an example, a domain model 104 which includes the various definitions of relevant domain terms can supply the names for the values extracted from the request 152. The domain model 104 enables implementing an intelligent, automatic approach to identifying relevant key-value pairs from the request 152. In an example, the domain model 104 can be based on various ML algorithms such as decision trees, linear regression, neural networks, Bayesian networks, support vector machines (SVMs), nearest neighbor and the like. The domain model 104 can be further trained via one or more of supervised or unsupervised learning. The domain model 104 can be scaled for different field types and value types. The domain model 104 can provide one or more definitions for various types of fields such as (regex (e.g. Account number), controlled (e.g. (annual plan maximum=do not accumulate)=look up, free-text=analytics, non-standard elections (in- and out of network comments) and the like. In an example, 3-4 fields to be updated may be identified for certain field types. The information to be processed for identifying the key-value pairs can include one or more of the email associated with the request 152 and the documents 154 that may be attached to the email and the additional documents 156 that can be retrieved from the external knowledge bases 108 using the request 152 and/or the domain model 104.

AI based techniques such as OCR can be initially employed to convert documents that may be in non-editable image formats to machine readable textual files. Then textual processing techniques including, but not limited to, parsing, tokenization, stop word removal, stemming, lemmatization, etc. and Natural Language Processing (NLP) techniques such as, but not limited to, text/pattern matching, named entity recognition (NER) can be employed to identify the terms from the domain model 104 which may be relevant to the request 152 and to extract the values for the terms from the request 152. The domain model 104 can be designed to prioritize flexibility or performance speed in different examples. The document processing system 100 can therefore be configured to compare a variety of fields and field types across multiple documents while the domain model 104 can validate the fields. In an example, the document processing system 100 can provide GUIs for user validation of the fields.

The documents 154 in the request 152 which can include one or more component documents, may therefore pertain to various automated processes that can be enabled by the document processing system 100. The automated processes in the benefits enrollment domain can correspond to new plans, renewals, off renewals or particular type of plans (e.g., ERISA) and the like. In an example, the relevant data fields from the documents can be mapped into a single master database. An intent analyzer 106 accesses the extracted information from the request 152 for intent analysis 162 which can output the intent 164. The intent 164 can include data that is indicative of the type of automatic process to be executed by the document processing system 100. As mentioned earlier, the intent 164 can be determined based on NLP and textual data processing techniques. In an example, particular data fields from the domain model 104 can be compared with the name value pairs from the request 152 to determine the intent 164. The examples discussed herein refer to one intent for simplicity. However, it can be appreciated that if multiple process codes are included in the request 152, then multiple intents can be deduced serially or in parallel depending on the configuration of the data processing system 100 and automatic execution of corresponding multiple processes can be enabled.

Determination of the intent 164 enables identification of the input documents and particular fields required for automatic execution of the process in addition to the corresponding output documents or other results that are expected to be generated by the automatically executed process. Based on one or more of the domain model 104 and the intent 164, the relevant documents can be selected and concatenated into a single, internal master document 172. The concatenation into the internal master document 172 can enable robotic process automation (RPA) or downstream processes. The internal master document 172 can be generated in different formats such as a text file, a spreadsheet, an extensible markup (XML) file database etc. for different use cases based on the nature of the automated process to be executed. Furthermore, the internal master document 172 can be configured to meet ingestion specs of downstream process systems for seamless processing.

Various documents in different data formats can be required for different processes. The required documents can include text files, documents with structured data, database files, and/or image files which may not be editable and/or searchable etc. Referring to the healthcare benefits processing example, different combinations of multiple benefits documents can be outlined in the domain model 104 for a single intent type. In an example, the document processing system 100 can query other computing systems such as an external RPA tool to request and receive additional information (i.e. a handshake test). The comparison of values in the documents from the request 152 with the information in the domain model 104 can include fine grained processing including look up e.g., words, terminology and the like. The comparison of documents can also include coarse grained processing such as analytics associated with comments, sentences, paragraphs and the like. In some instances, the document processing system 100 can flag one or more fields for human validation which can be executed via one or more GUIs 140.

The document comparison enables the document processing system 100 to compare documents of different data formats and verify the information supplied in the request 152 for discrepancies. External knowledge base 108 from one or more other/external data sources can be accessed by the document processing system 100 to identify the discrepancies. The external knowledge base 108 can include explicit knowledge such as rules, inputs from subject matter experts (SMEs), machine-generated inputs generated using machine learning, predictive modeling algorithms, etc., RPA requirements such as the output formats that are compatible with downstream processes in external systems, etc. The external knowledge base 108 can also include implicit knowledge including contextual knowledge or mined knowledge gained via implementation of various AI elements. A discrepancy processor 112 determines or identifies the discrepancies between the compared documents. Various types of comparisons that will be detailed further herein can be employed to identify the discrepancies between the documents.

When a discrepancy is identified, the discrepancy processor 112 can analyze the reason for the discrepancy. The analysis can include identifying those data fields wherein the comparisons failed to produce a positive result. In an example, various data models can be employed for comparing the fields/data types. The data field comparisons can be based on features including but not limited to one or more of the data types, field names, and context associated with the field. Threshold probabilities can be defined for the data models wherein the compared fields that meet the thresholds are deemed as matching while those that fail to meet the thresholds are considered as mismatched/unmatched fields.

The mismatched/unmatched fields from the discrepancy processor 112 can be communicated to a data resolver 114 for an intelligent resolution. In an example, the data resolver 114 can access one or more of the external knowledge base 108, content management systems associated with the insurance processes and other external systems, such as those executing downstream or upstream RPA processes in order to automatically identify a resolution to the discrepancy. When an unmatched data field, a non-compliant rule or other reason for the mismatch is determined by the data resolver 114, a solution to rectify the mismatch can also be determined. For example, the solution can include a problem statement regarding the mismatch, the solution can include a suggestion to comply with the rule that the match failed to meet, etc.

If the data resolver 114 fails to automatically resolve the discrepancy, the information can be displayed for user review using one of the GUIs 140. In an example implementation, upon user review and confirmation, the information or the required fields augmented with the matches, discrepancies and resolutions are communicated to the document builder 116 which builds an internal master document 172. The internal master document 172 can be a spreadsheet, a text file, a comma separated values (csv) file and the like which can be consumed by automatically executed processes. The document builder 116 may further present the internal master document 172 for user review. Upon user review and confirmation, the internal master document 172 can be communicated to external systems for enabling RPA of the processes being executed by the external systems. In the event a user does not approve the data, the user can make the changes via the GUI or the user may flag the data for other reviews. The changes or edits made by the user to the extracted information can be stored within the document processing system 100 and used to train one or more of the intent analyzer 106 and the domain model 104 by the feedback collector 118. The document processing system 100 can therefore intelligently automate processes such as benefits setup (including new subscriptions, renewals, maintenance) by automatically extracting required fields from the request 152 and implementing the domain model 104 to enable automatic and manual review and evaluation of documents and implementing RPA to automate the input of the extracted information into the external systems. This can improve the speed and accuracy of the automatically executed processes while mitigating against seasonal spikes in resourcing.

The document processing system 100 can also include a performance evaluator 122 that enables a user-specific or a process-specific performance evaluation. For example, when a validation process is being executed, the performance evaluator 122 can provide for false positives in a set of options to be evaluated by a user. The user's response is recorded and analyzed to evaluate the user and/or the process. Responses from different users can be aggregated for a given set including the false positives in order to determine if errors on the false positives are occurring from the user's side or are due to the process. The responses may be evaluated based on a bell curve so that if more users are making a mistake on the false positives then the error on the side of the process can be recorded else the error will be recorded for the user. Based on the recordation of erroneous user responses, the user can be provided with further training on the validation process or the validation process itself can be modified to better guide the users in improving the accuracy. Modification of the process can entail further training of the domain model 104 and/or tweaks to the process rules, changes to the domain-specific terminology, the extracted fields etc.

Figure 2:
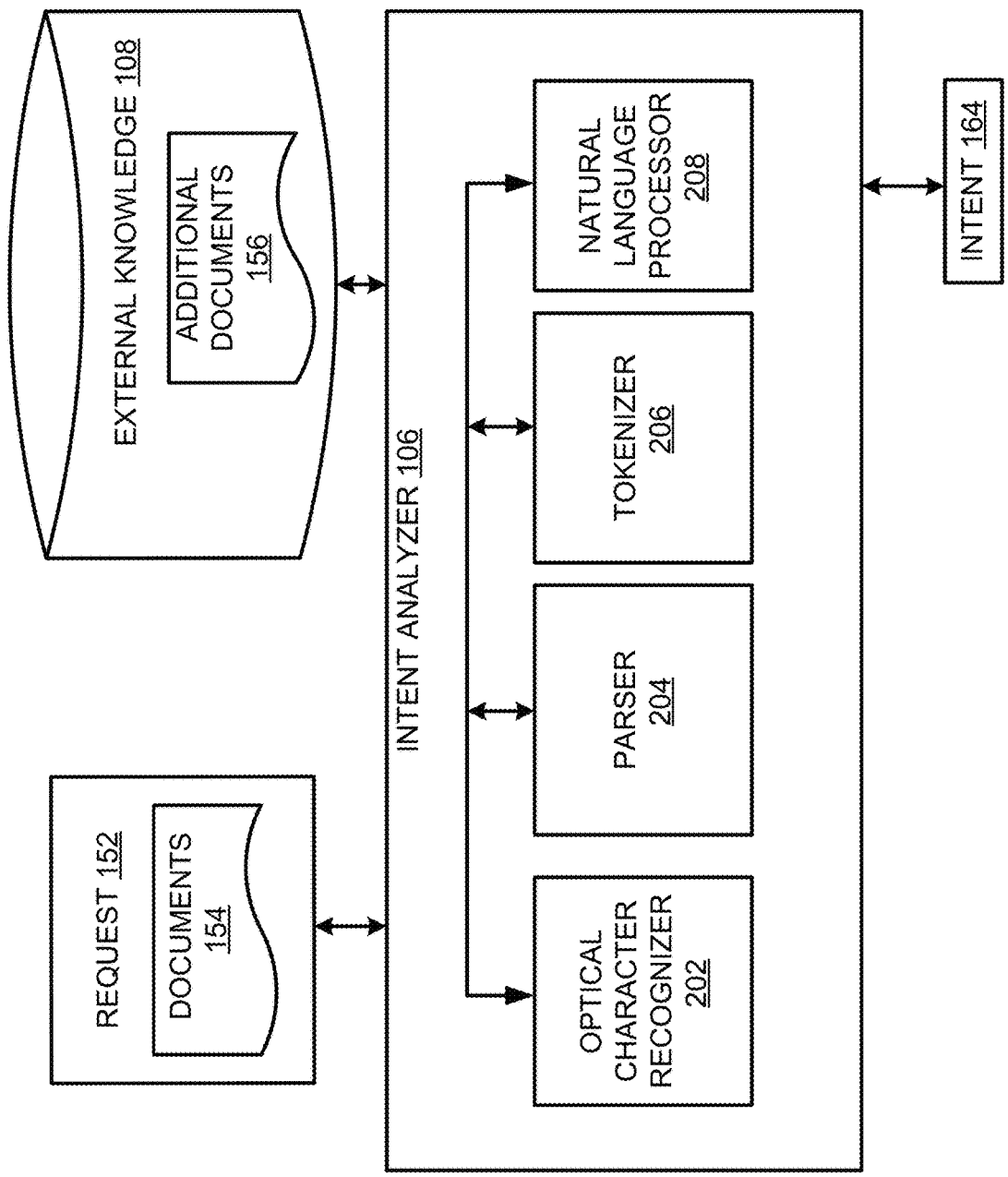
FIG. 2 shows a block diagram of an intent analyzer in accordance with some examples disclosed herein.

FIG. 2 shows a block diagram of the intent analyzer 106 in accordance with some examples disclosed herein. The intent analyzer 106 processes the received request 152 using an optical character recognizer 202, a parser 204, a tokenizer 206 and a natural language processor 208 to identify the intent 164 conveyed in the request 152. As mentioned herein, the request 152 and any of the documents 154 associated therewith can be received in various formats which can include structured machine-readable data such as an email, a spreadsheet, a text document etc. or as an unstructured, non-machine readable/editable format such as a scanned image. Based on the formats of the request 152 and its contents including the documents 154, an optical character recognizer 202 can be employed. The parser 204 and the tokenizer 206 are employed to obtain word tokens from one or more of the output of the optical character recognizer 202 or the content of the request 152. The natural language processor 208 can also be employed to identify the intent 164 based on explicit and implicit knowledge included in the external knowledge base 108. In an example, the intent 164 or identifying indicia of the automatically executed process to be enabled in response to the request 152 can be obtained not only using the textual or other content from the request 152, the documents 154 and the like but also via contextual information. For example, the contextual information can include placement of a text identifier within a document, textual content (e.g., words surrounding a term of interest), the document in which the term of interest occurs, and the like.

Figure 3:
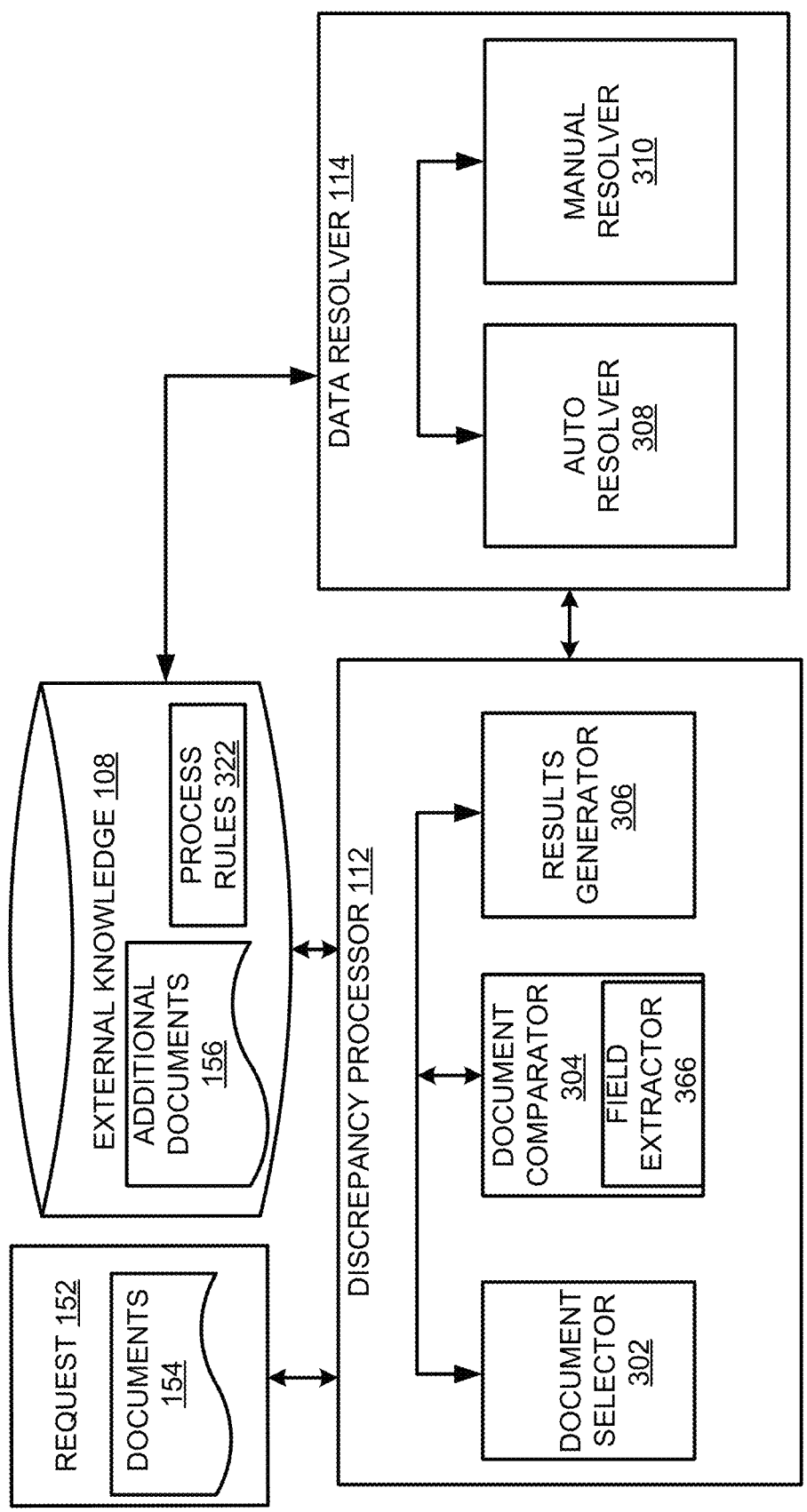
FIG. 3 shows a block diagram of a discrepancy processor and a data resolver in accordance with the examples disclosed herein.

FIG. 3 shows a block diagram of the discrepancy processor 112 and data resolver 114 in accordance with the examples disclosed herein. The discrepancy processor 112 includes a document selector 302, a document comparator 304 and a results generator 306. The document selector 302 enables selection of documents to be compared in order to enable automated execution of the process pertaining to the request 152. As mentioned herein, the document selection is enabled by both the external knowledge base 108 and the domain model 104. In particular, process rules 322 included in the external knowledge base 108 enable identification of the relevant documents needed for the automatic execution of the process. The documents selection not only involves the documents 154 received in the request, but also the additional documents 156 from the external knowledge base 108 that can be retrieved based on the intent 164, the domain model 104 and the process rules 322. In an example, the document selector 302 can include AI models such as classifiers that can be explicitly trained for document selection using labelled training data.

The document comparator 304 can execute comparison routines on the selected documents based on the process rules 322. Referring to the healthcare domain for example, the request 152 can pertain to an automated process such as a risk adjustment process wherein a diagnosis for a patient put forth by a medical provider such as a physician is to be validated and confirmed. The document comparator 304 can compare information from the documents in a patient's file history such as the patient's electronic health record (EHR) to a list of documents as specified by the process rules 322. It can be appreciated herein that the documents employed by the document comparator 304 for comparisons may not only include documents with unstructured data such as scanned reports, bills, hand-written prescriptions etc. but also structured data such as values from a database or a comma separated values (CSV) file and the like. More particularly, the patient's EHR can include one or more of the documents 154 received in the request 152 and the additional documents 156. A field extractor 366 included in the document comparator 304 can extract fields from the EHR. The fields thus extracted can be compared to the fields specified by the process rules 322. In addition, a diagnosis domain model which corresponds to the domain model 104 customized to the risk adjustment process can also be employed. The comparisons can include comparison on name-value pairs wherein the values can be determined to correspond to those as specified in the process rules 322 or the values can be determined to be out of bounds to the values specified by the process rules 322.

The output of the document comparator 304 can include particular fields or name-value pairs and their respective comparison metrics such as similarities for example, between the documents being compared. The results generator 306 can compare the metrics to the corresponding thresholds thereby determining the existence of discrepancies. For example, for a given field including a name-value pair extracted from one or more of the documents 154, 156, the similarities between the data extracted from the documents 154, 156 and the values as specified by one or more of the process rules 322 can be compared to similarity thresholds. If the similarity threshold is satisfied then the results generator 306 does not record a discrepancy and proceeds towards generating the internal master document 172 that enables automatic execution of the process. If the similarity threshold is not satisfied, then a discrepancy can be recorded.

Whenever a discrepancy is recorded, the data resolver 114 receives the output from the discrepancy processor 112 for resolution of the discrepancy. An auto resolver 308 included in the data resolver 114 be configured to initially process the discrepancy for automatic resolution. In an example, the domain model 104 can be employed for auto resolution. For example, the domain model 104 can include various formats associated with an entity name such as XYZ or XYZ Inc., etc. The auto resolver 308 can access such alternative formats, synonyms, etc. to automatically resolve discrepancies. The various matches that can occur between different values that can be used by the auto resolver 308 are detailed herein. If the discrepancy cannot be automatically resolved, a manual resolver 310 can alert a user via one of the GUIs 140 to receive manual input for the discrepancy resolution. The manual input thus received can be obtained by the feedback collector 118 as training data for training the document processing system 100.

Figure 4:
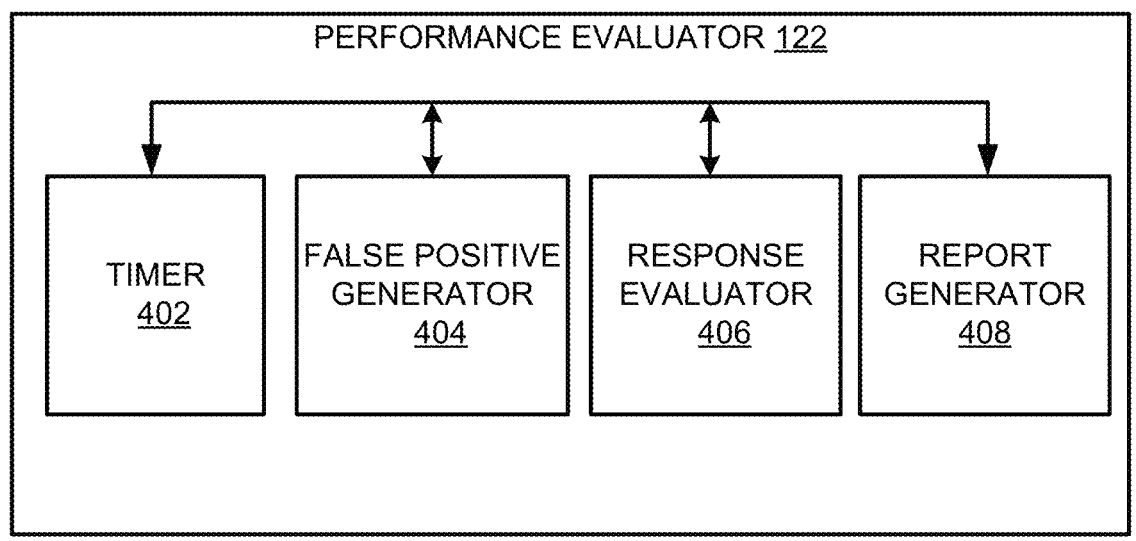
FIG. 4 shows a block diagram of a performance evaluator in accordance with the examples described herein.

FIG. 4 shows a block diagram of a performance evaluator 122 in accordance with embodiments described herein. The performance evaluator 122 can be configured to generate false positives during the functioning of the document processing system 100 to evaluate the performances of one or more of the user and/or the document processing system 100. The performance evaluator includes a timer 402, a false positive generator 404, a response evaluator 406 and report generator 408. The timer 402 can be configured to generate a signal at different intervals to generate false positives during process flows of the document processing system 100. Whenever the signal is received from the timer 402, the false positive generator 404 can manipulate thresholds associated with comparisons, discrepancy resolutions, etc. Therefore, the performance evaluator 122 causes the document processing system 100 to include a false positive value for user review/validation. The user's response to the false positive value is recorded and evaluated by the response evaluator 406. If the user correctly identifies the false positive value(s), the user can be deemed as trained on the operations of the document processing system 100 and/or the particular process being automated. If the user fails to identify the false positive value, the user and/or the process can be flagged for further training. In flagging the user, or the process, aggregated user responses can be employed so that the majority of the responses from other users to similar false positive values can be used in determining whether the user or the process need further training. The report generator 408 generates a report for the training accordingly.

FIG. 5 shows a tabular form 500 of example validations associated with various fields in the request 152. It can be appreciated that the validations are shown only by the way of illustration and that other validations can be implemented by the document processing system 100 in accordance with examples disclosed herein. The validations can be specified either as part of the term definitions in the domain model 104 or as part of the process rules 322. The table 500 includes example inputs 502, the validation process 504, the expected output of the validation process 506 and some example fields 508 which may undergo the validation processes.

FIG. 6 shows a tabular form 600 of example matches that can occur between various values. These matches can be employed by one or more of the document comparator 304 and the data resolver 114 in executing document comparisons and discrepancy resolutions. Various comparison types such as but not limited to direct/identical matches, identical matches without punctuation/capitalization and the like, set comparison, state comparison, range comparison, fuzzy matches, synonyms, abbreviations, acronyms, presence of particular terms and comparison of derived values can be executed by the document processing system 100.

Figure 7:
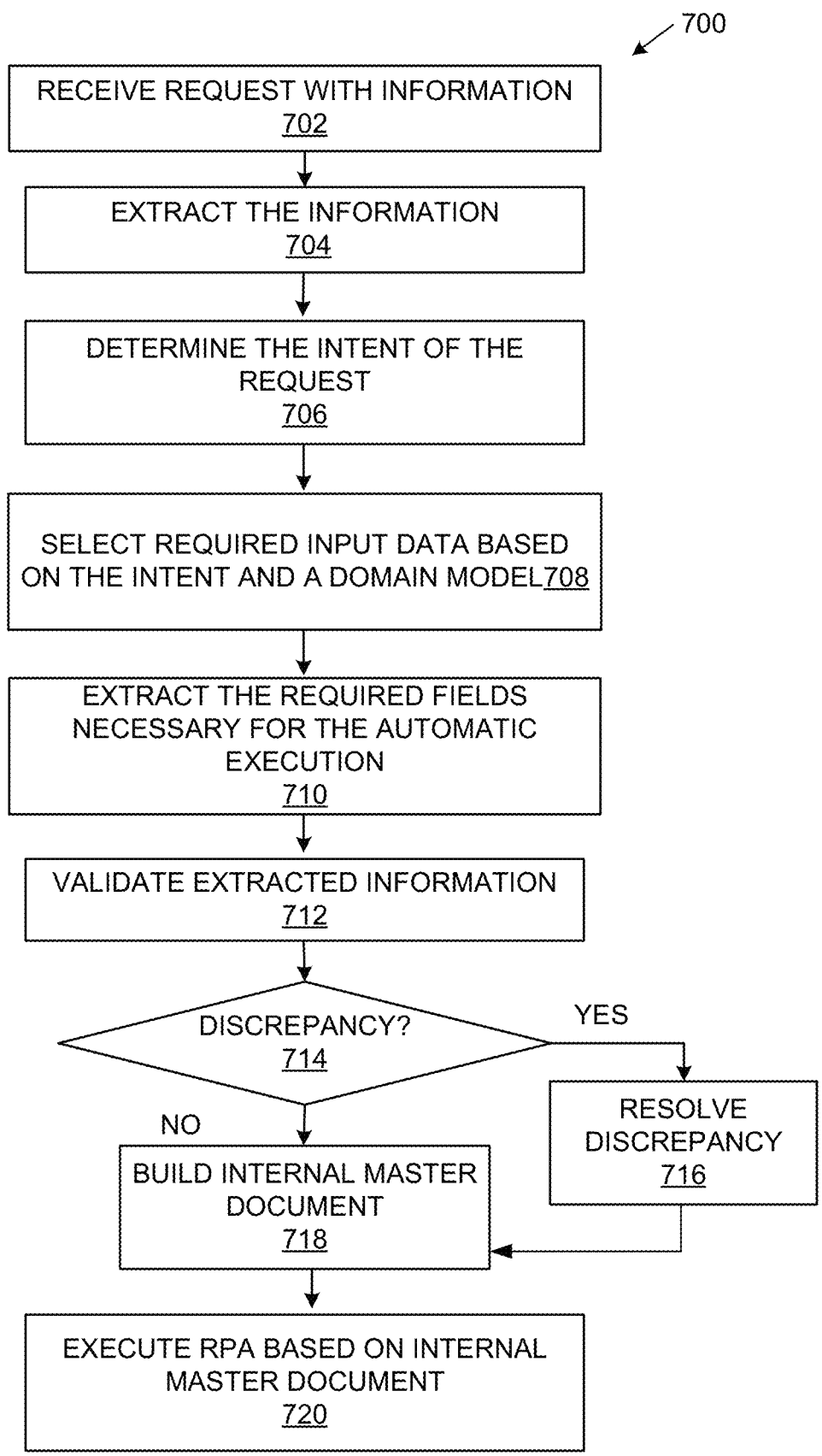
FIG. 7 shows a flowchart that details a method of document processing in accordance with the examples disclosed herein.

FIG. 7 shows a flowchart 700 that details a method of document processing in accordance with examples disclosed herein. The method begins at 702 wherein a request 152 including information associated with a process to be automatically executed is received. Referring to an example in the healthcare domain, the request 152 can pertain to an email which includes a specific request type e.g., renewal of health benefits with the required documents attached. In an example, the specific request type can include text conveying the intent or specific code indicating that a sender of the email is requesting benefits renewal. The request 152, which, in the example being discussed includes an email, is analyzed using textual processing techniques as detailed herein and the information including the attachments is extracted at 704. At 706, an intent of the request 152 is determined using the domain model 104. Based on the determined intent 164, the automatic process to be executed is identified. The identification of the process in turn enables relevant information from the request 152 and the domain model 104 to be selected. The required input data including the documents 154 from the request 152, the additional documents 156 from the external knowledge base 108, the required fields from the documents 154, 156 or the domain model 104, etc., can be selected for further processing at 708. At 710, the fields necessary for the automatic execution of the process are extracted from the selected input data. In an example, the intent 164 can determine the process to be automatically executed while the domain model 104 can supply the information or the fields necessary for the automatic execution of the process. In an example, manual validation of the fields can be executed. The information including the selected input data is validated at 712. The validation can include analyzing the extracted information and the intent 164 in light of the domain model 104 and the process rules 322. In an example, similarity measures or other information comparison techniques, such as, thresholds and the like can be employed to analyze the documents for discrepancies at 714.

If it is determined at 714 that the fields are valid (i.e., no discrepancies exist), then an internal master document 172 is built at 718 from the validated fields. The valid fields extracted from the request can be transformed into a format, such as a spreadsheet format to build the internal master document 172 which feeds downstream RPA. At 720, the RPA can be executed by an external system or by the document processing system 100 based on the internal master document 172. For example, the RPA can employ techniques such as text matching, NER to match attributes and values from the internal master document 172 to an eForm thereby automatically feeding values from the internal master document 172 into the eForm such as an enrollment form and the like. In another example, the RPA can include multi-stage processes wherein the eForm can be further used to generate a contract or enroll plan participants and the like. The contracts or list of enrollment participants and the like can also be automatically be communicated to the concerned persons or automatically loaded into designated processor-readable storage media.

If it is determined at 714 that the fields are not valid and that one or more discrepancies exist (YES), the method proceeds to 716 wherein the discrepancies are resolved based on data from one or more of the intent 164, the domain model 104 and the external knowledge base 108. In an example, the resolution of the discrepancies can require human intervention. Examples of user edits to resolve discrepancies are discussed infra. External knowledge base 108 including implicit knowledge and explicit knowledge can be employed to automatically look up and identify possible resolutions to the discrepancies as outlined herein. The required fields augmented with matches, discrepancies and the recommended solutions can be displayed for explicit human resolution and validation in an example. For example, if further information is needed, a human user may send an email request for the requisite information. Upon the resolution of discrepancies, the method returns to 718 to build the internal master document 172 which is then used for the automatic execution of the process.

As mentioned herein the document processing system 100 can be customized to automate various processes. The customization can include customizing the domain model 104 to include the domain-specific terminology, parameters, fields and the like pertaining to the process. Furthermore different external knowledge bases can be accessed depending on the process to be automated. Similarly, the discrepancy processor 112, the data resolver 114, the document builder 116 can be configured to execute functions corresponding to the particular process to be automated. The document processing system 100 can thus be configured to automate one or more processes via providing different customized domain models. The selection of the domain model 104 for the particular process being automated is enabled by the intent 164 derived from the request 152. Accordingly, various flowcharts are described herein that detail the automation of different processes by the document processing system 100. Again, as mentioned herein the processes described below may pertain to the healthcare domain, however, it can be appreciated that the processes from other domains such as manufacturing, financial and the like can be similarly automated.

Figure 8:
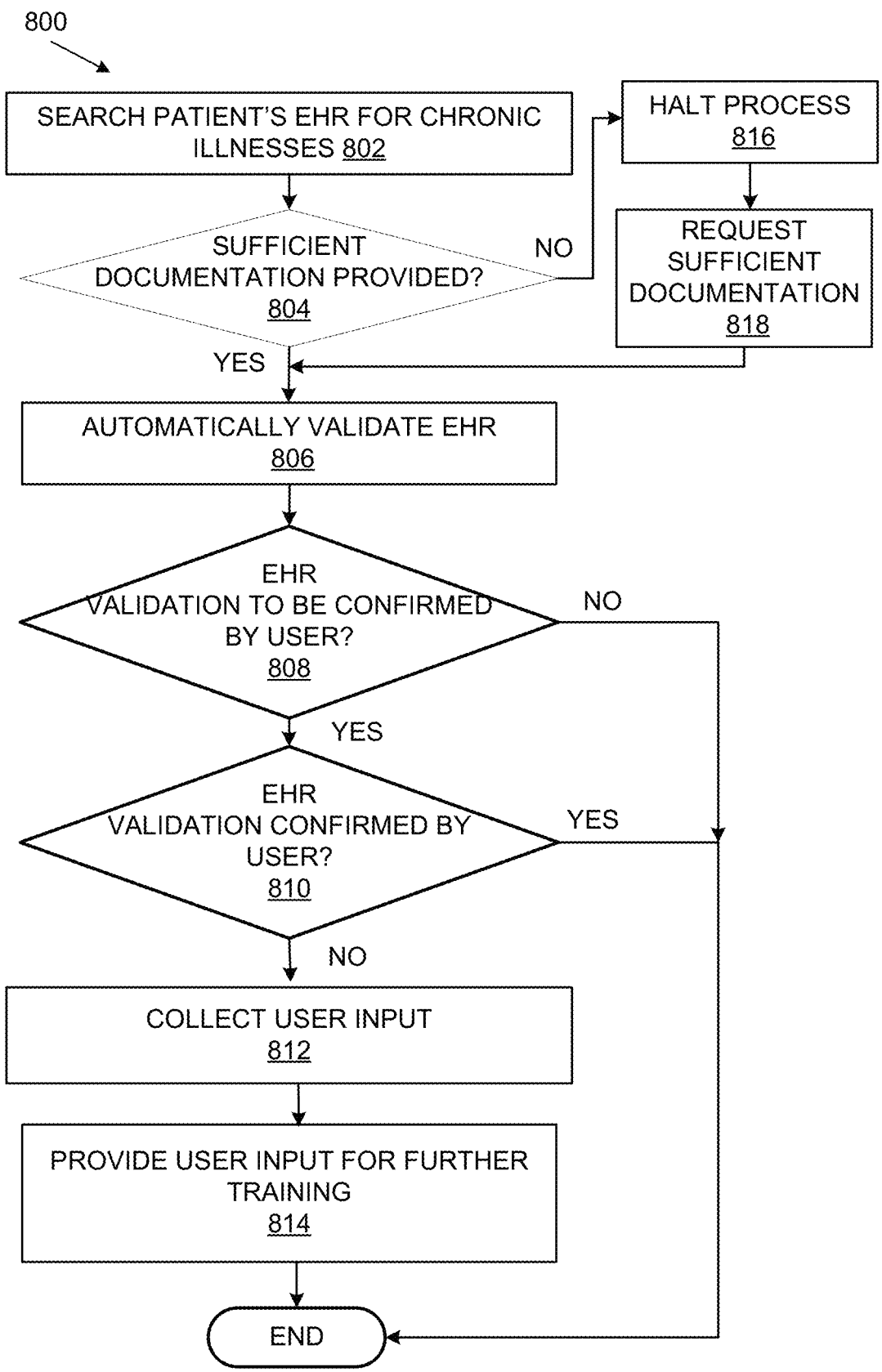
FIG. 8 shows a flowchart that details automation of a risk adjustment process in accordance with the examples discussed herein.

FIG. 8 shows a flowchart 800 that details automation of a risk adjustment process in accordance with examples discussed herein. Specific chronic conditions can be considered as risk adjusted conditions. The risk adjusted conditions and the supporting evidence are analyzed to validate that the conditions exist. For example, the document processing system 100 when implementing a risk adjustment process can analyze a patient's medical record (e.g., EHR) and identify that a doctor diagnosed a patient with diabetes and validates such diagnosis further based on patient medication such as metformin, lab results from A1C test etc.

The descriptions related to the steps of receiving a request, identifying an intent and selection of the domain model are not repeated at this point for brevity as these are common across the various processes described herein. Accordingly, the description of the initial process steps of: determining that the request pertains to risk adjustment process, selecting a risk domain model and selecting documents required for the automation of the risk adjustment process are not repeated here for brevity. In the risk adjustment process, the documents 154, 156 can pertain to a patient's EHR which can include a listing of the patient's providers' visits (encounters), and related documentation such as prescriptions, bills, reports, etc. At 802, the patient's EHR is searched for specific chronic illness to identify the encounter(s) for which the member requests reimbursement. Chronic illnesses can be identified, for example, via diagnosis codes that occur within the EHR. At 804, it is determined if the patient's EHR provides documentation that satisfies eligibility criteria for reimbursement. In an example, the document comparator 304 can be employed to determine if the patient's EHR meets an eligibility criteria as outlined by the process rules 322. By the way of illustration, the eligibility criteria can include documents that indicate that the illness is being measured/monitored, evaluated, assessed/addressed and treated (MEAT).

If it is determined at 804 that sufficient documentation supporting the chronic illness is not provided, the process can be halted at 816 and sufficient documentation can be requested at 818. If sufficient documentation is provided, the EHR is automatically validated at 806 based on the risk domain model and the process rules 322 for the risk adjustment process. Based on the confidence levels associated with the validation at 806, the process can terminate at 806 in an example. In an implementation the output of the validation process can be presented to a user on an output GUI for confirmation at 808. At 810 it is determined if the user has confirmed that the EHR validation. If yes, the method terminates/ends. If it is determined at 810 that the user has not confirmed validation or eligibility for reimbursement, the method moves to 812 to collect user input. The user input thus collected can be provided to the feedback collector 118 for further training of the document processing system 100 at 814. Upon the validation of the EHR, an automated reimbursement may be initiated based on the validated, confirmed EHR.

Figure 9:
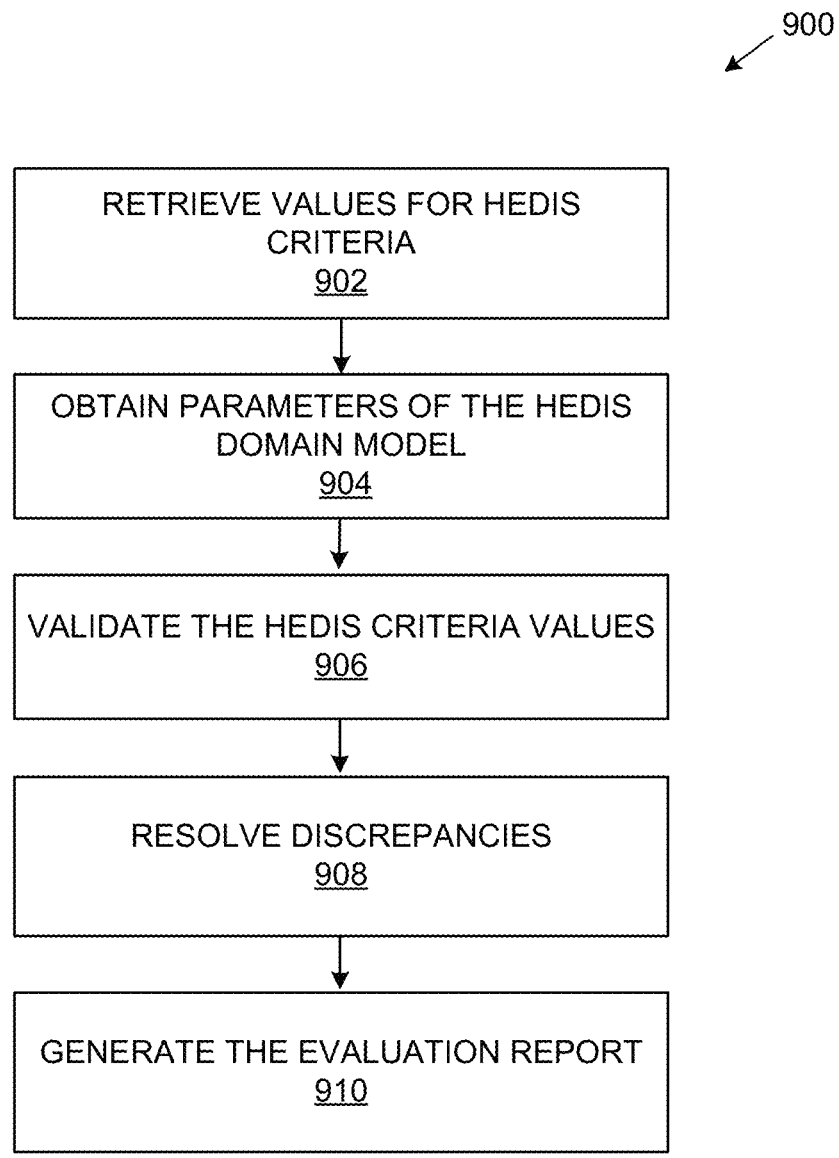
FIG. 9 shows a flowchart that details automation of a process of evaluating a healthcare plan under Healthcare Effectiveness Data and Information Set (HEDIS) in accordance with some examples discussed herein.

FIG. 9 shows a flowchart 900 that details automation of a process of evaluating a healthcare plan under Healthcare Effectiveness Data and Information Set (HEDIS) in accordance with examples discussed herein. HEDIS is a performance measurement tool that enables evaluation of healthcare plans using various criteria including but not limited to effectiveness of care, access/availability of care, experience of care, utilization and relative resource use and healthcare plan description information. The process outlined in the flowchart 900 can employ approximately 84 measures under HEDIS to evaluate healthcare plans. More or less measures may be employed for evaluation depending on the nature of the healthcare plan. The documentation such as, healthcare plan documentation, can be analyzed for justification of quality measures pertaining to a member's care such as body mass index (BMI), blood pressure measurements, diabetes management, cancer screenings etc. to validate whether or not that the measures were met.

In this example the request 152 can pertain to a HEDIS evaluation of a healthcare plan and the request 152 can include one or more documents related to the healthcare plan and additional documents 154 related to the healthcare plan can be retrieved from the external knowledge base 108 based on the intent 164 derived from the request 152. Also, the domain model 104 in this example pertains to a HEDIS domain model which can include the various criteria used for HEDIS evaluation as process parameters along with the variations in terminology, synonyms, antonyms etc. The process rules 322 can specify the values and the thresholds for the criteria that determine whether or not a given plan meets the criteria. At 902, the various HEDIS criteria values from the documents 154, 156 received in the request 152, or retrieved from the external knowledge base 108, are retrieved. The parameters of a HEDIS domain model can correspond to the HEDIS criteria used to evaluate a healthcare plan are obtained at 904. The criteria values retrieved at 902 for the parameters from the HEDIS domain model are validated at 906 based on thresholds as specified in the process rules 322 corresponding to the HEDIS evaluation process. Any discrepancies that are identified are resolved at 908 via one or more of automatic resolution or manual resolution as disclosed herein. The internal master document 172 corresponding to a report on the healthcare plan evaluation under the HEDIS measures is generated at 910.

Figure 10:
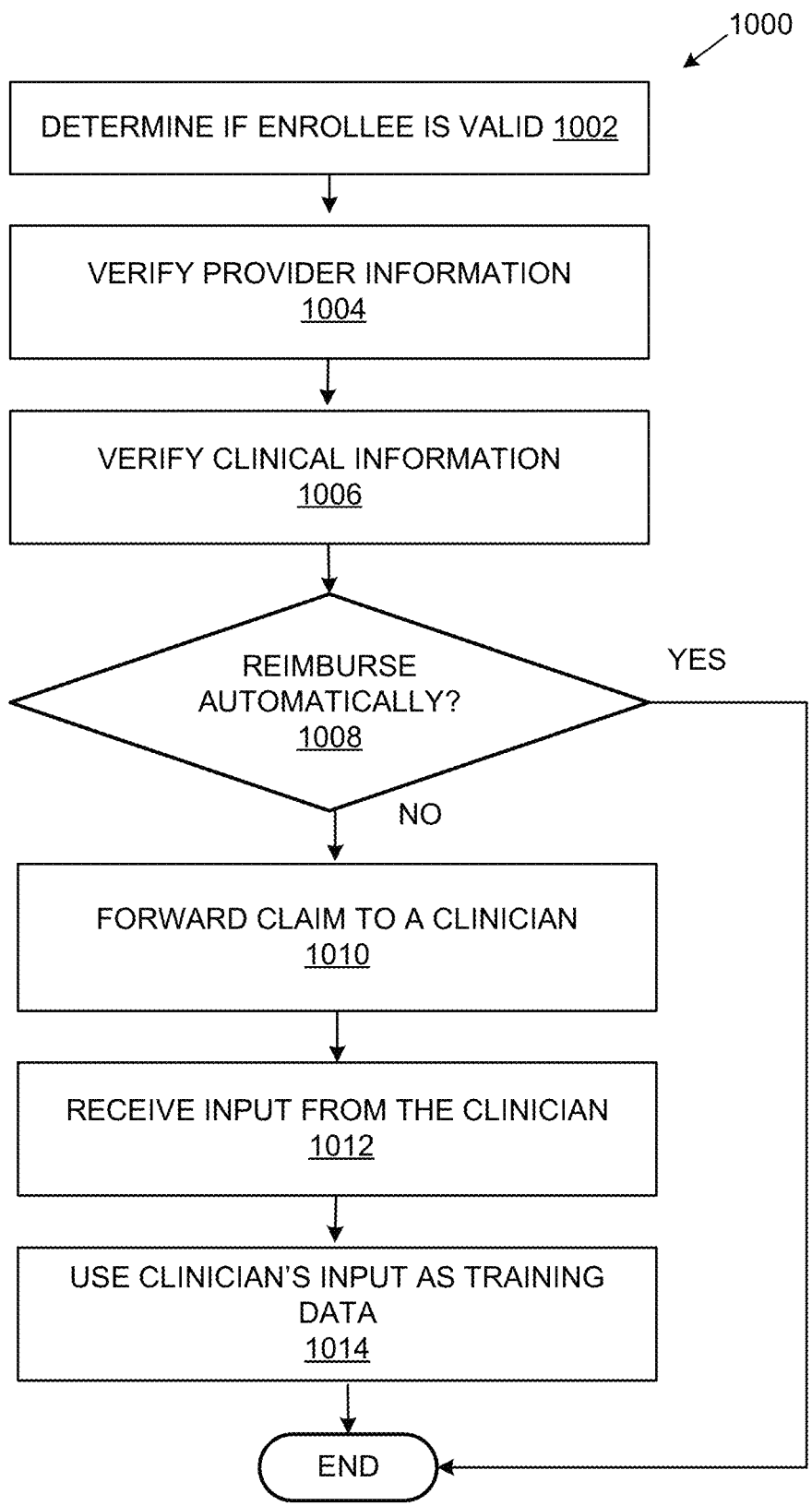
FIG. 10 shows a flowchart that details a method of utilization management associated with a healthcare provider in accordance with the examples disclosed herein.

FIG. 10 shows a flowchart 1000 that details a method of utilization management associated with a healthcare provider in accordance with the examples disclosed herein. In this example the request 152 received from a plan enrollee can pertain to a utilization management process wherein the intent 164 is to make a claim on a healthcare plan. The request 152 can be processed by the document processing system 100 in accordance with the examples disclosed herein to automatically determine if the claim is valid and should be reimbursed. Accordingly, the request 152 can include one or more documents 154 related to the claim such as prescriptions, receipts, lab reports and the like. Based on an analysis of the intent 164 of the request 152, other documents 156 such as the enrollee's signup sheet/database, the enrollee's healthcare plan information which are retrieved from the external knowledge base 108, the process rules 322 and the like are retrieved. The utilization management domain model which corresponds to the domain model 104 customized to the utilization management process is employed to facilitate the retrieval of the documents etc. Moreover, the process rules 322 can specify the values or requirements that the enrollee and/or the provider must meet in order to secure reimbursement.

Various AI techniques pertaining to text recognition, comparison and classification of data can be used to identify and differentiate between the patient's information and the providers' information. The method can begin at 1002 wherein the enrollee information is verified in order to determine that the enrollee is a valid member of the healthcare plan associated with the claim. At 1004, the provider information including the rendering provider and the referring provider from the claim is verified to determine that the providers are members of the healthcare plan. Verification of the provider information can include determining that the providers are good partners and are not on, for example, a bad provider list. At 1006, the clinical information from the claim is verified objectively to determine if a medical necessity of a particular procedure/prescription is recorded in the documents 154, 156 and that the claim can be automatically reimbursed. At 1008 it is determined if an automatic decision regarding reimbursement of the claim can be rendered by the document processing system 100 based on a comparison of the description of the condition(s) in the EHR with the description of the condition(s) as detailed in the necessity for the procedure in the external knowledge base 108. The descriptions can also include comparison of number data to determine if the numbers from the lab reports meet certain thresholds that necessitate the test. In an example, such necessity descriptions can be specified in the process rules 322. In an example, the process rules 322 can further specify if a particular claim can be auto approved or needs to be forwarded to a clinician based on an urgency factor. For example, a procedure to heal a dangerous wound from an accident can be automatically approved. Specific words such as 'urgent', 'asap', 'immediate' etc. can be employed to signify the urgency. If an automatic decision for reimbursement is rendered at 1008, the decision can be provided to a user for confirmation in one example. In another example, the decision to reimburse can be automatically implemented without user confirmation and the procedures to reimburse such as depositing the reimbursement amount in a bank account of the enrollee etc. can be further executed.

If an automatic decision for reimbursement could not be made at 1008 (NO), the documents 154, 156 and the other data which may have been extracted from the request 152 etc. can be forwarded to a clinician at 1010 such as a nurse to receive a decision regarding the reimbursement. The input from the clinician is received at 1012 regarding reimbursement of the claim. In an example, the clinician's input can be used as training data for the document processing system 100 at 1014. The clinician can provide explicit input regarding the exact fields within the documents that are to be filled in or the documents which are missing or other rules that were not followed that caused a rejection of the reimbursement. Thus, newer knowledge from the clinician's training can be updated to the document processing system 100.

Figure 11:
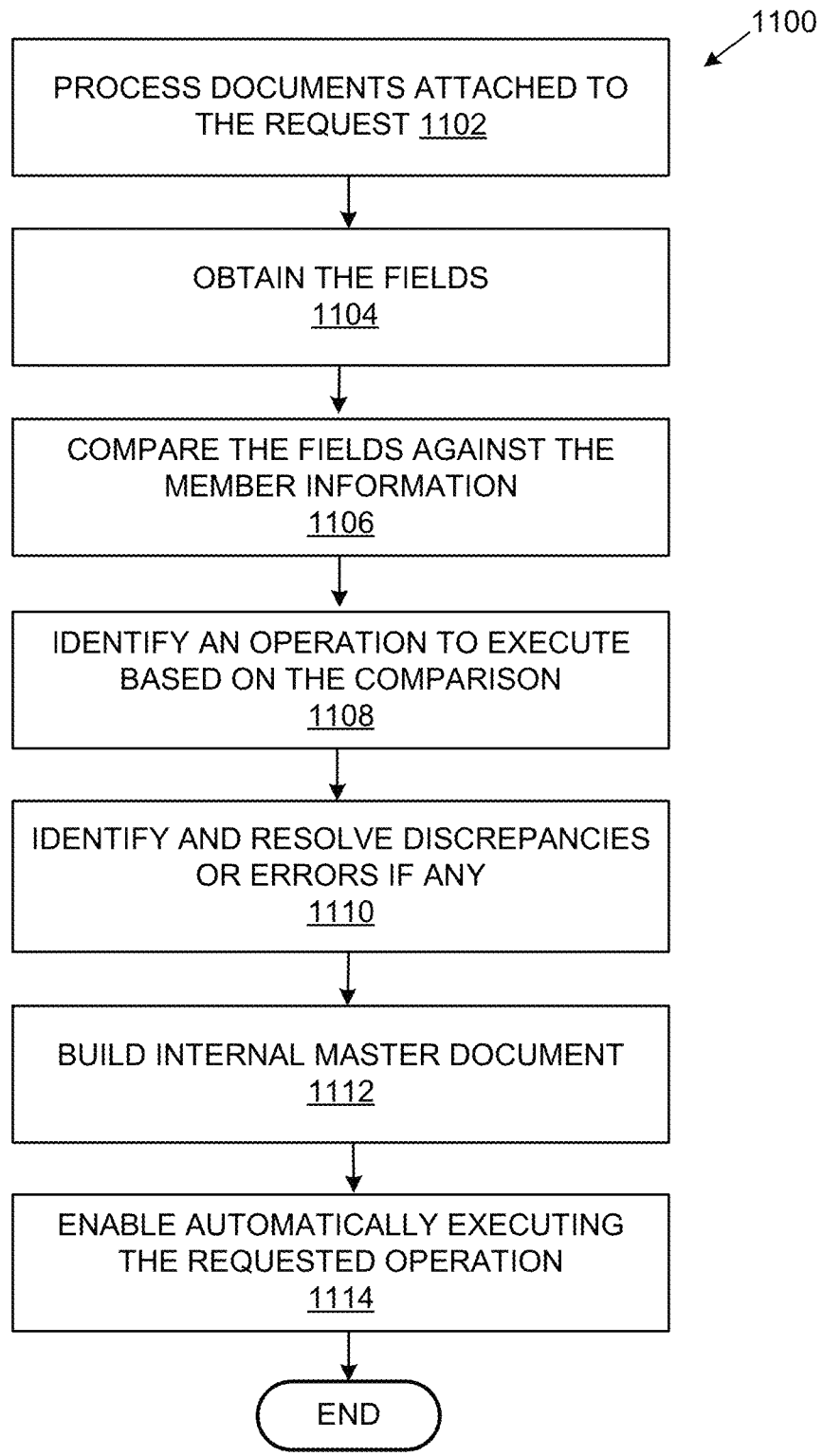
FIG. 11 shows a flowchart that details an intelligent, automatic method of enabling health care benefits to enrollees in accordance with the examples disclosed herein.

FIG. 11 shows a flowchart 1100 that details an intelligent, automatic method of providing health care benefits to enrollees in accordance with the examples disclosed herein. As mentioned above the request 152 in this example would convey an intent 164 to enroll/add, update or delete members to the healthcare plan wherein an enrollment domain model corresponds to the domain model 104 and inputs the terminology fields etc. related to the enrollment domain. Upon extracting the intent 164 from the request 152, the documents 154 attached to the request 152 are processed at 1102. In an example the documents can include enrollment forms to update member or enrollee information or delete an enrollee from the membership to the healthcare plan. The fields for processing the forms are obtained at 1104. The fields can be compared against the member information associated with the healthcare plan at 1106 for example, in the external knowledge base 180. Based on the comparison, an add, an update or a delete operation on member information can be identified at 1108. At 1110 discrepancies or errors if any are identified and resolved. For example, if updates to member information indicate a change in a social security number, it may indicate an error which needs to be resolved. Automatic resolution routines can be executed to identify similar information from multiple other resources and may automatically update, for example, the SSN info of the member. Alternately human intervention may be sought in order to fix the error. At 1112, the internal master document 172 can be built by aggregating necessary information received in the request 152 and retrieved from the external knowledge base 108. The automatic execution of the requested operation of adding, updating or deleting the member information is enabled at 1114.

In addition to member information changes to a healthcare plan, the document processing system 100 can also be configured to add, delete or update provider information. As described above, the intent 164 to change the provider information is identified from the request 152, the documents 154, 156 are retrieved from the request 152 and the external knowledge base 108. Accordingly, the forms or requests with member/provider information that is to be updated are analyzed. Such updates could include address changes, changes to contact information such as telephone number, etc. The request 152 to update, add or delete a provider information can be received for example, via an email or a fax. The fields from these documents can be compared and information can be updated based on the intent 164. A discrepancy resolution routine as described above for updating the membership information can also be implemented for updating the provider information.

The discrepancy processor 112 can identify the required fields and analyse the contextual information to identify the operation to execute. The document processing system 100 can handle the fields being on one page or can collate fields spread across multiple pages in different data sources. The contextual information enables the document processing system 100 to identify the information to be updated for a given provider. A provider management domain model corresponds the domain model 104 and includes variations of words, such as nicknames, abbreviations that are synonymous with a term spelled out, etc. When adequate information is provided (e.g., in terms of enough fields) the requested operation to add, update or terminate a provider can be automatically executed.

When adding specific providers, the request 152 can include more than one piece of provider information. For example, a hospital may require addition of ten doctors and a single email with the information regarding all the doctors to be added can be received. Moreover, addition of providers can include provider credentialing wherein the provider information such as, but not limited to, the provider's social security number (SSN), diploma information etc. that are to be verified are identified. For example, the document comparator 304 can identify documents such as diplomas, and the types of words that are to be identified (e.g., school, grade point average (GPA), address etc.). Moreover, the discrepancy processor 112 can be configured to check for errors and consistency. As described herein for other processes, the document processing system 100 automatically identifies and classifies the various documents and the user can provide the final approval.

Figure 12:
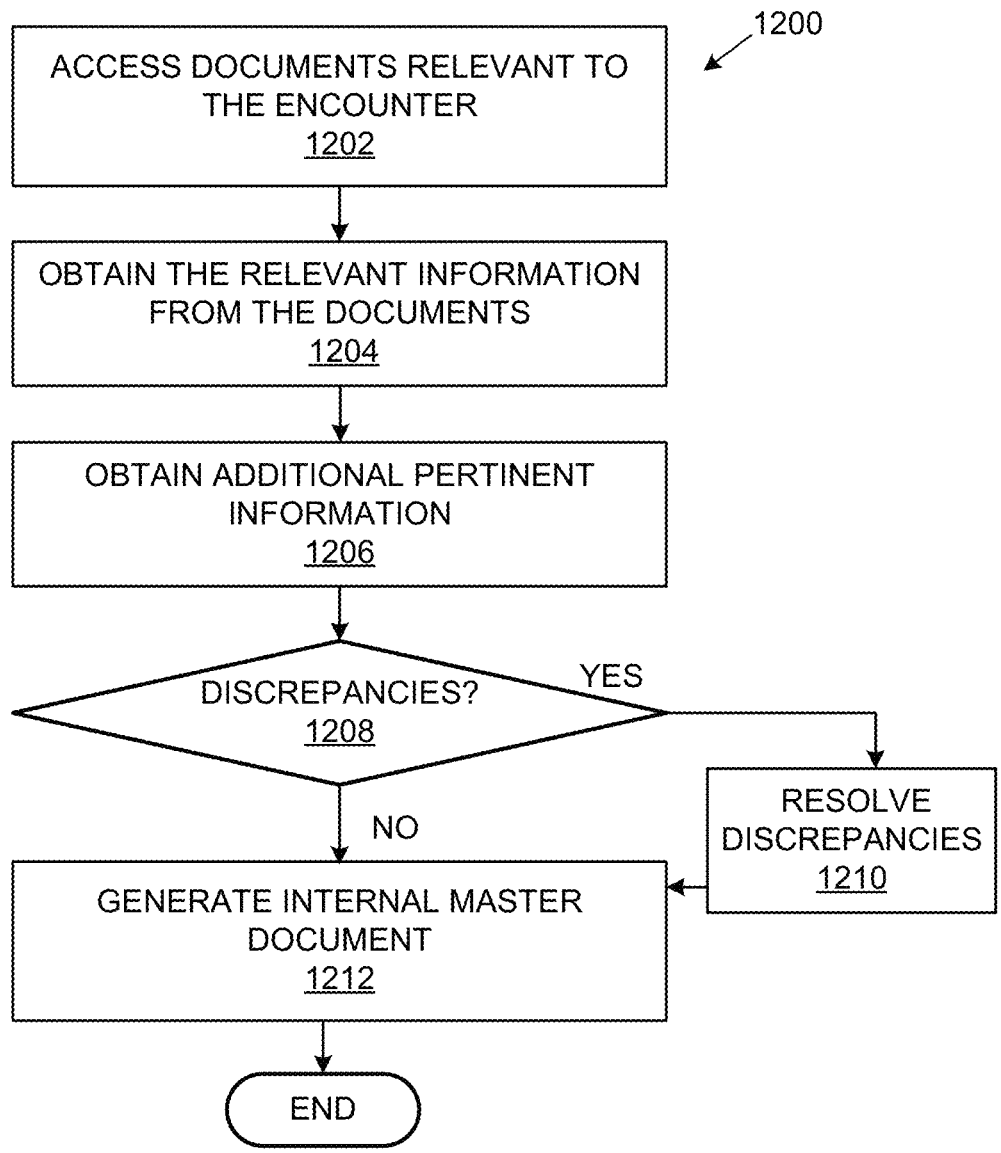
FIG. 12 shows a flow chart that details a method of automating the billing process for a provider in accordance with the examples disclosed herein.

FIG. 12 shows a flow chart 1200 that details a method of automating the billing process for a provider in accordance with the examples disclosed herein. Again, in this example, the request 152 would pertain to billing a healthcare plan for services rendered by a healthcare provider to an enrollee during an encounter. Accordingly, the intent to bill can be derived from the request 152 and a medical billing domain model, corresponding to domain model 104, is accessed to facilitate the automated billing process. The billing domain model can include the terms related to the particular billing domain (e.g., medical billing or even a particular specialized medical billing), the definition of the terms within the billing domain such as the procedures or medications or other services for which bills/invoices may be raised, synonyms, acronyms, nouns including proper nouns such as names of the providers, nicknames, etc., verbs, and the like.

At 1202, the documents relevant to the encounter can be accessed from the request 152. At 1204, the relevant information to bill the healthcare plan is obtained from the documents attached to the request 152 and/or the external knowledgebase 108. By the way of illustration, the procedures conducted during the encounter, the prescriptions written, the medication provided, the provider information, etc., can be obtained from the documents accessed with the request 152. On the other hand, the information regarding the healthcare plan to be billed can be retrieved from the external knowledgebase 108. Additional pertinent information such as the amounts to be billed, the documents needed for billing, etc. can be obtained from the process rules 322 at 1206.

At 1208, it is determined if any discrepancies exist that need to be resolved. The discrepancies can be identified by the comparison of the additional pertinent information with the document(s) or the information in the request 152. The comparisons can be based on the process rules 322. In an example, the process rules 322 can specify the amounts to be billed in terms of percentages or dollars, the entity the invoice is to be directed towards, the date or time period if any by which the bill is to be submitted, and the like. Based on the comparison, if it is determined that the amount is greater than those specified in the process rules 322, a discrepancy can be raised. Similarly, if there is a mismatch between the insurance plan information between the document in the request 152 and the additional pertinent information a discrepancy can be raised. Thus, the process rules 322 can define particular discrepancies that can be raised based on the various field mismatches that are likely to occur during the billing process.

If a discrepancy is raised (YES), the process moves to 1210 to resolve the discrepancy and then moves to 1212 to generate the internal master document 172. As mentioned herein, the discrepancy can be automatically or manually resolved. For example, if a discrepancy is raised due to mismatch of a provider name such as 'John Doe' versus 'J. Doe', the billing domain model can be used to automatically resolve the discrepancy. Or if there is a mismatch of dates between two documents associated with the request 152, then date information from other documents can be used to automatically resolve the mismatch. The auto resolver 308 can be configured for such automatic resolution of discrepancies for different fields or data elements that may be encountered during the billing process.

If no discrepancies exist (NO), the process moves to 1212 to generate the internal master document 172 that enables automatically billing a healthcare plan for the encounter. The internal master document 172 can collate the information from the different sources that is being collected and analyzed during the automatic billing process. For example, the internal master document 172 can include the patient's name, the encounter date, services rendered and the service provider information from the request 152, the document attached to the request 152, any definitions or clarifications related to the services can be obtained from the domain billing model, the amounts to be billed can be obtained or calculated based on the process rules 322 which in turn may derive the amounts from the healthcare plan documents etc.

The format and the content of the internal master document 172 enable it to function as not only a centralized repository for the information but also as an input document to the execution of the automatic billing process. In an example, the internal master document 172 can be displayed to a user for review and approval. Upon the user's approval, the automatic billing task can be executed. The automatic billing task can include automatic generation and transmission of another request via an invoice email or fax etc. as specified by the process rules 322. The invoice email can include relevant billing information along with the documents necessary for the billing, again, based on the specifications in the process rules 322.

The document processing system 100 can enable generation of a patient profile at pharmacies in accordance with another example. When a prescription is faxed for processing to a pharmacy by a doctor, the document processing system 100 can receive the prescription, identify and classify the information therein using the pharmacy domain model corresponding to the domain model 104. The patient profile can be automatically created from the information available in the prescription or information in an existing profile can be updated with the data from the new prescription. An alert can be generated to the pharmacist regarding a new prescription to be filled and related functions such as printing labels etc. can be automatically executed.

In an example, the document processing system 100 can be used in validating and reimbursing enrollees in disability or life insurance plans. The procedures can be similar to the reimbursements under healthcare plans as outlined herein. Again, the request 152 for reimbursement can be received via fax or email for reimbursement under a particular plan. The documents 154 from the request and other additional documents 156 are identified based on an intent, the documents 154, 156 can be compared with each other or with information in the external knowledge base 108 which can include one or more of the disability/life insurance plan data and the enrollee information. Any discrepancies between the documents 154, 156 and data from the external knowledge base 108 can be automatically and/or manually resolved using a disability/life insurance domain model (corresponding to the domain model 104) and based on the process rules 322 corresponding to the insurance procedures. The output of the automated procedure can be presented to user who can either approve or disapprove the reimbursement. In an example, the document processing system 100 can also produce a recommendation on whether or not the reimbursement can be approved based on the results of the various categorizations, comparisons, validations etc. which the user may decide to accept or decline.

Figure 13:
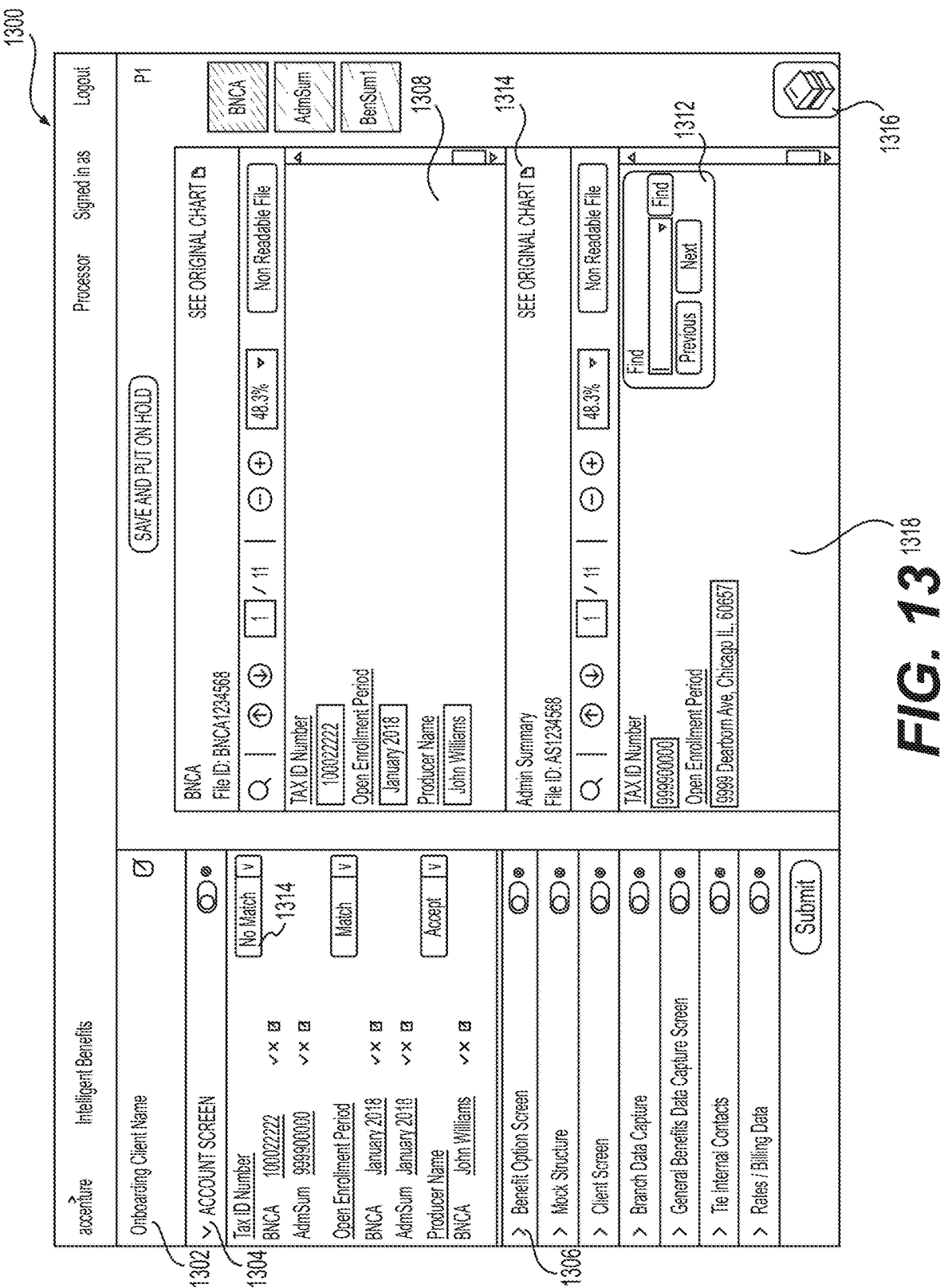
FIG. 13 shows a graphical user interface (GUI) that enables user editing of the information extracted from a request in accordance with the examples disclosed herein.

FIG. 13 shows a graphical user interface (GUI) 1300 that enables editing of the information extracted from the request 152. The edited information is displayed within the various panes of the user interface 1300. The pane 1302 includes one or more tabs, such as tabs for account screen 1304 and benefit option screen 1306 which can be expanded to display the extracted information from one or more of the request 152, the documents 154, 156 and the domain model 104. Furthermore, the extracted information can be displayed within the panes 1308, 1318. For example, representations show in panes 1308 and 1318 may mimic the appearance of information in the original documents 154, 156, e.g., the font, the layout and other visual elements of the data from the original documents are maintained in the display. However, unlike the original documents which may be in formats which are non-editable or which cannot be read by machines (e.g., scanned images), the information displayed within the panes 1308 and 1318 is machine-readable and searchable and can be edited by, for example, a user or another device. The 'see original chart' button 1314 can provide access to the original attachment document for example, as an overlay on the UI 1300. Furthermore, example UI widgets such as drop-down box 1314 can be provided to enable users to input explicit feedback such as match or no match i.e., whether one or more of the attached documents and/or the domain model 104 have matching data. User feedback can be employed by the feedback collector 118 to further train one or more of the intent analyzer 106 and the domain model 104 so that when a similar discrepancy is again detected the next time, the document processing system 100 is enabled to handle the discrepancy automatically. In addition, a library or even access to the external knowledge base 108 can be provided via a UI element 1316.

Figure 14:
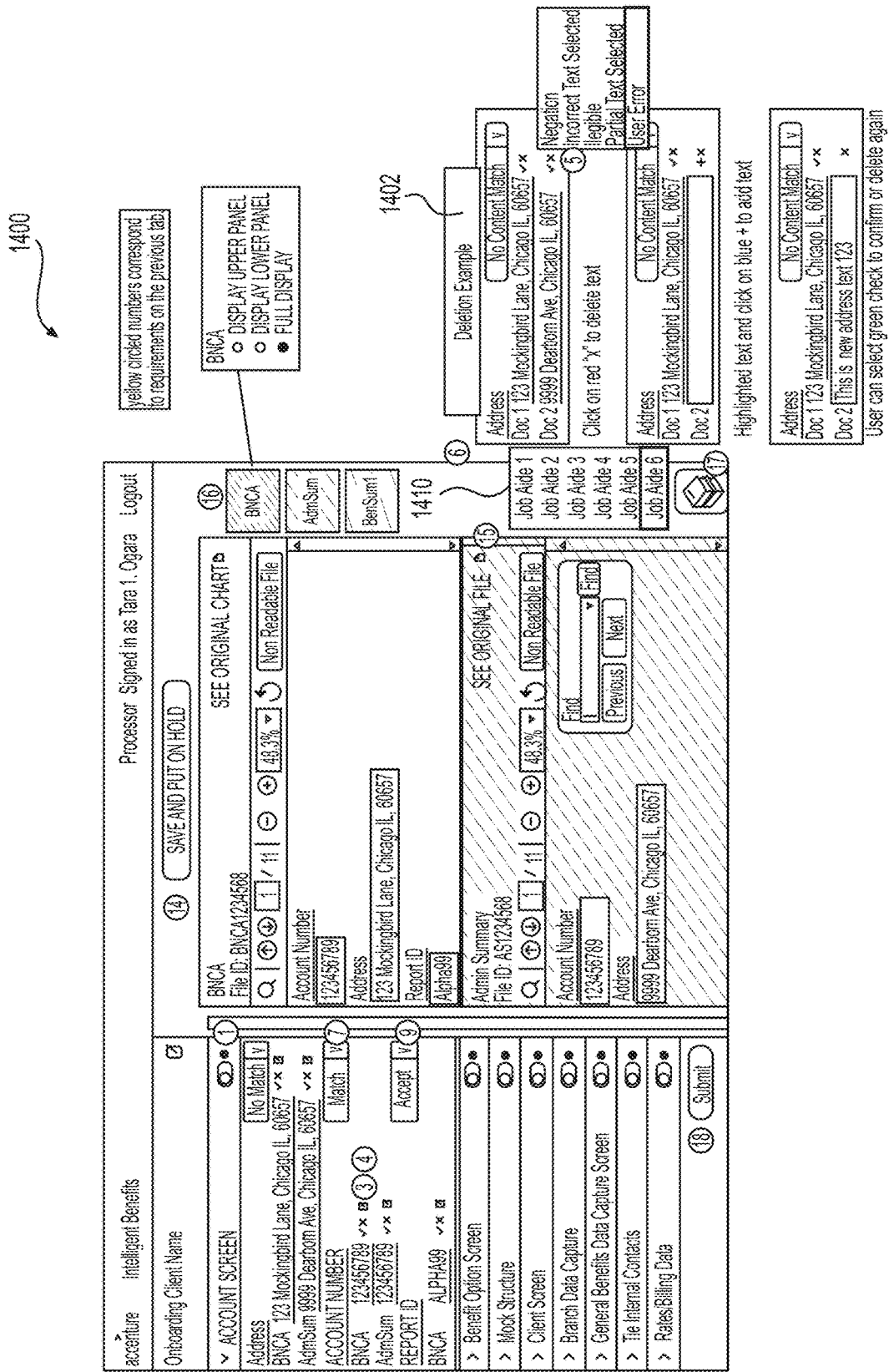
FIG. 14 shows a GUI including various user edits that are enabled by the document processing system in accordance with the examples disclosed herein.

FIG. 14 shows a GUI 1400 that illustrates various user edits that are enabled by the document processing system 100. The UI 1400 shows access to a listing of various jobs 1410 to be processed by the document processing system 100 which may or may not require human review. In addition, UI 1400 shows widgets for the deletion and edit operations as shown at 1402. Various widgets are provided such as for example, a red 'X' to delete the text or a blue '+' to add the text and the like.

Figure 15:
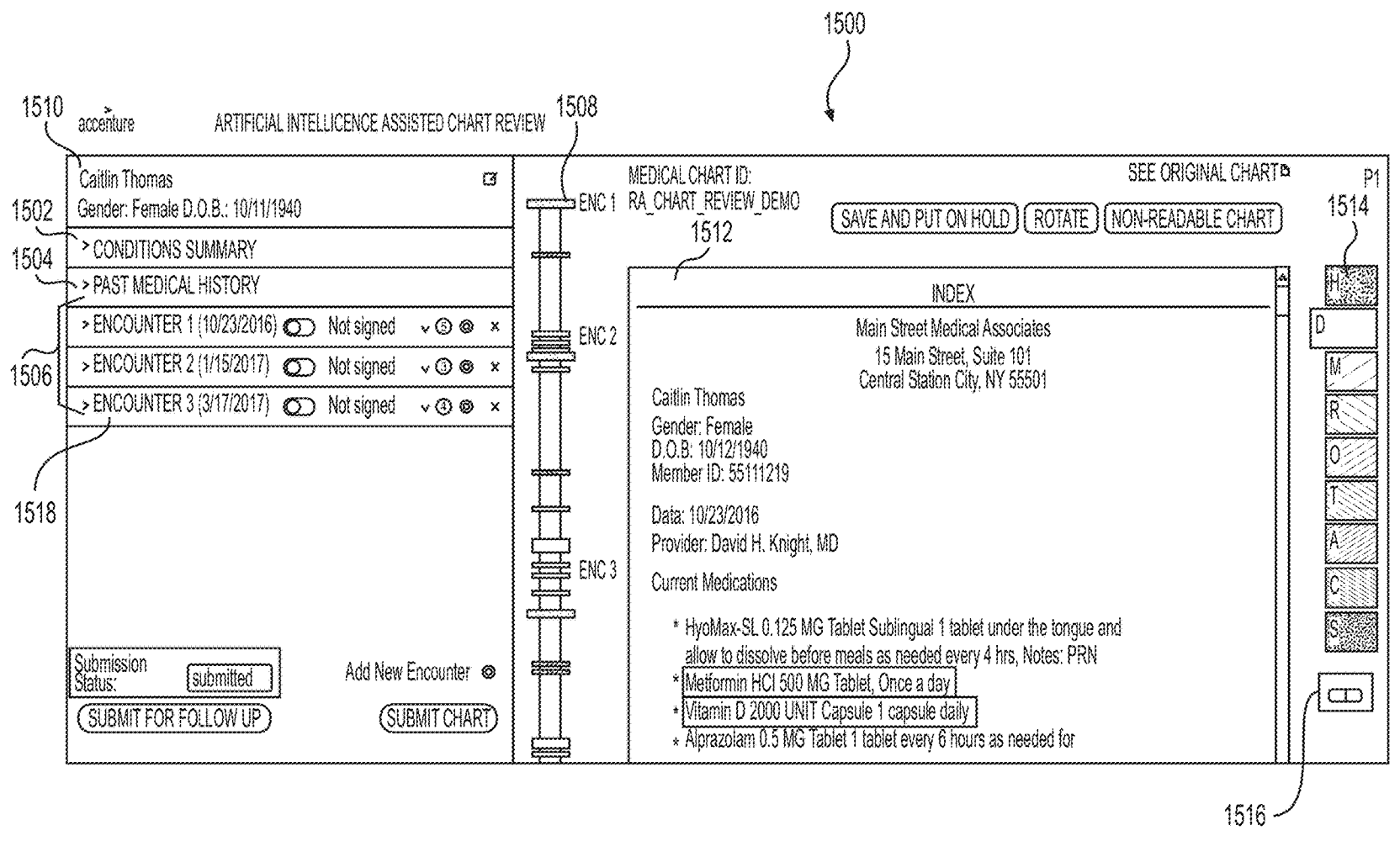

FIG. 15 shows a GUI 1500 including an EHR of a patient that is displayed by the document processing system 100 for review in accordance with some examples disclosed herein. The user interface 1500 can be displayed during the automated medical billing process or risk adjustment process disclosed herein for example. The left hand side (LHS) 1510 of GUI 1500 includes various menu items that can be selected to view/display different parts of the EHR including, a conditions summary 1502, past medical history 1504 and the list of encounters with one or more providers 1506 is presented with each encounter 1518 as a selectable menu item. In addition, a timeline 1508 also displays various encounters. The document processing system 100 is configured to analyze the various documents 154 received with the request 152 and the documents 156 retrieved from external knowledge bases.

The right hand side (RHS) of the GUI 1500 includes a display 1512 of one of the documents generated at various encounters or retrieved during the automatic execution of the process. The display 1512 shows one such document. Colored tabs 1514 are included which provide easy user access to various parts of the EHR and further edit the accessed portions of the HER wherein the type of information is associated with each of the tabs. For example, the first tab H stands for medical history, D for diagnosis codes, M for medications, R for test results, O for tests ordered, T for treatment plans, A for assessment summary, C for Chief complaint and S for symptoms. It can be appreciated that selecting the tabs can display the information gathered from the various documents of the EHR into the internal master document wherein different portions of the internal master document correspond to a particular tab. A medication search feature 1516 is included which enables access to a drugs database, identifying medication uses and commonly associated diagnoses for a given medication.

Figure 16:
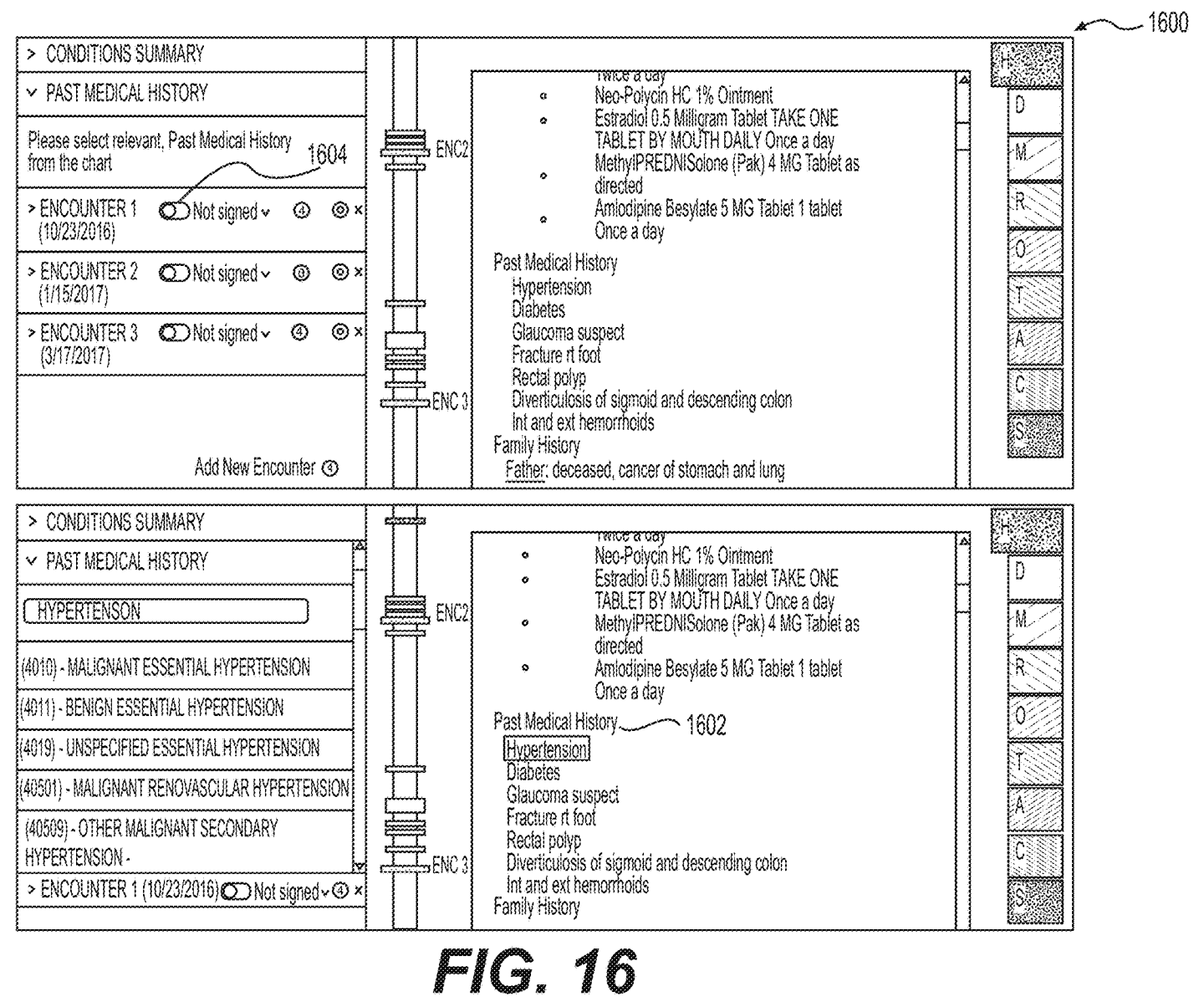

FIG. 16 shows a GUI 1600 the portion of the EHR or the internal master document 172 that is displayed when the H tab corresponding to the medical history is selected. The various medical conditions included in the past medical history are displayed at 1602. Similarly, selection of other tabs can show other portions of the internal master document. As each portion of the internal master document 172 is validated by a user via review on the RHS, the user can sign off on that portion which is indicated by a switch 1604 that toggles between a 'not signed' and a 'signed' status.

FIG. 17 shows a GUI 1700 that enables a user to sign off on a portion of the EHR such as the selectable encounter 1518 in accordance with the examples disclosed herein. For example, the first identified encounter can be selected by the user on the LHS and the information therein reviewed on the RHS as shown in the GUI 1600. The switch is initially in a 'not signed' state 1702 and upon review of the portion, the user can select a 'signed' state from a dropdown box which can cause the switch to flip to a signed state 1704. Fields such as but not limited to diagnosis codes, supporting documentation, encounter dates etc. can be verified by the user during the review process. In case the user decides not to sign the portion, the user can select one or more reasons from the list 1752 and press the 'submit for follow up' button 1754.

It can be appreciated that FIGS. 13-17 are example GUIs and that other GUIs which differ by displaying information in different locations on the interface, using different identifiers for representing information, different icons, tables, layouts, etc. can also be implemented by the data processing system 100 in accordance with the example disclosed herein.

Figure 18:
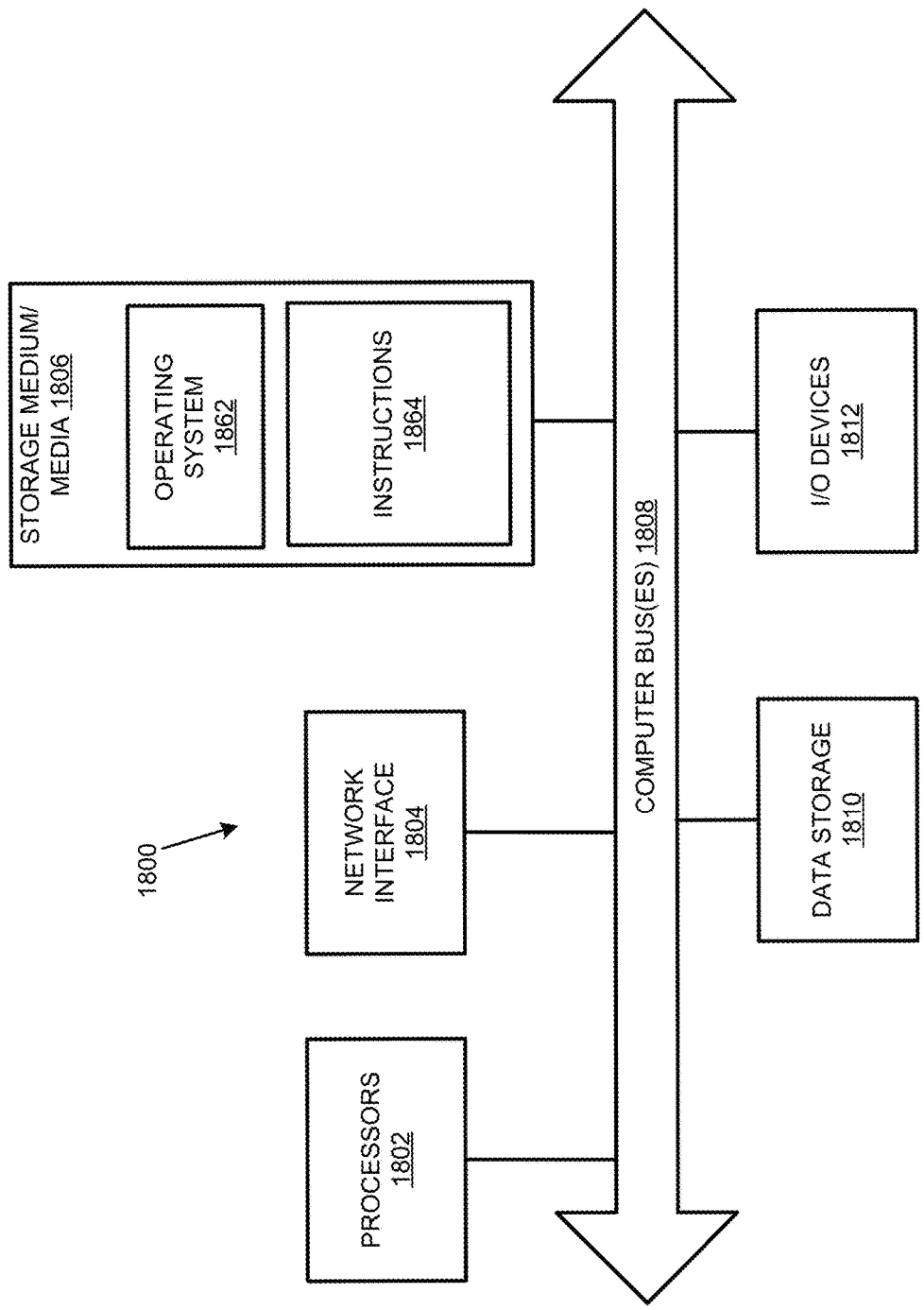
FIG. 18 illustrates a computer system that may be used to implement the document processing system in accordance with examples described herein.

FIG. 18 illustrates a computer system 1800 that may be used to implement the document processing system 100. More particularly, computing machines such as desktops, laptops, smartphones, tablets, wearables which may be used to generate or access the non-editable files corresponding to unstructured documents and their component documents may have the structure of the computer system 1800. The computer system 1800 may include additional components not shown and that some of the components described may be removed and/or modified.

The computer system 1800 includes processor(s) 1802, such as a central processing unit, ASIC or other type of processing circuit, input/output devices 1812, such as a display, mouse keyboard, etc., a network interface 1804, such as a Local Area Network (LAN), a wireless 802.11x LAN, a 3G or 4G mobile WAN or a WiMax WAN, and a computer readable storage medium 1806. Each of these components may be operatively coupled to a bus 1808. The computer readable storage medium 1806 may be any suitable medium which participates in providing instructions to the processor(s) 1802 for execution. For example, the computer readable storage medium 1806 may be non-transitory or non-volatile medium, such as a magnetic disk or solid-state non-volatile memory or volatile medium such as RAM. The instructions or modules stored on the computer readable medium 1806 may include machine readable instructions 1864 executed by the processor(s) 1802 to perform the methods and functions of the document processing system 100.

The document processing system 100 may be implemented as software stored on a non-transitory computer readable medium and executed by one or more processors. For example, the computer readable medium 1806 may store an operating system 1862, such as MAC OS, MS WINDOWS, UNIX, or LINUX, and code or machine readable instructions 1864 for the document processing system 100. The operating system 1862 may be a multi-user, multiprocessing, multitasking, multithreading, real-time and the like. For example, during runtime, the operating system 1862 is running and the code for the document processing system 100 is executed by the processor(s) 1802.

The computer system 1800 may include a data storage 1810, which may include non-volatile data storage. The data storage 1810 stores any data used by the document processing system 100. The data storage 1810 may be used to store real-time data associated with the processes executed by the document processing system 100 such as the received requests, the various jobs to be executed, the selected documents, extracted fields, the internal master document that are generated and the like.

The network interface 1804 connects the computer system 1800 to internal systems for example, via a LAN. Also, the network interface 1804 may connect the computer system 1800 to the Internet. For example, the computer system 1800 may connect to web browsers and other external applications and systems via the network interface 1804.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A document processing and automation system, the system comprising:
   one or more processors; and
   a non-transitory data storage comprising processor-executable instructions that cause the one or more processors to:
   receive a request,
   the request comprising information related to a process, and the process to be automatically executed;
extract the information,
the extracted information used to facilitate automatic execution of the process,
the extracted information being from at least two documents,
the two documents having different formats and the two documents are associated with the process, and
the information being extracted based on a domain model;
identify an intent associated with the information,
the intent used for identifying the process, and
the intent being determined based on:
a textual processing technique, and
a natural language processing (NLP) technique;
obtain one or more required fields,
the required fields used for the automatic execution of the process from the at least two documents;
determine if one or more discrepancies exist in the required fields,
the determining based on comparing one or more values contained in the required fields;
build an internal master document based on validating the one or more required fields,
the internal master document enabling automatic execution of the process, and
the building an internal master document performed when no discrepancies are detected; and
determine a reason for the discrepancy based on one or more of:
the intent,
the domain model, and
the at least two documents;
receive data from an external knowledge base,
resolve the discrepancy based on the received data from the external knowledge base; and
transform the required fields into the internal master document configured for automatically executing the process.

2. The document processing system of claim 1, the processor-executable instructions for extracting the information from the request include instructions that cause the processor to:
parse and tokenize textual content of the request; and
extract at least one document pertaining to the process from one or more of the request and the external knowledge base.

3. The document processing system of claim 2, the processor-executable instructions for extracting the information from the request include instructions that cause the processor to:
extract the documents from the external knowledge base based on the intent.

4. The document processing system of claim 3, the processor-executable instructions for extracting the documents comprise instructions that cause the processor to:
employ trained document classifiers for the extraction of the documents from the external knowledge sources.

5. The document processing system of claim 3, the processor-executable instructions for identifying an intent comprise instructions that cause the processor to:
compare the information from the request with domain-specific terminology included in the domain model, wherein the domain model is customized to the process.

6. The document processing system of claim 1, wherein the domain model includes the required fields to be employed in the process, domain-specific terminology, definitions of the fields and types of the fields.

7. The document processing system of claim 1, wherein instructions for building the internal master document comprise further instructions that cause the processor to:
concatenate the required fields extracted from the at least two documents wherein the required fields include one or more name-value pairs.

8. The document processing system of claim 1, wherein instructions for building the internal master document comprise further instructions that cause the processor to:
determine a format of the internal master document based on the process to be automatically executed.

9. The document processing system of claim 1, comprising further instructions that cause the processor to:
enable display of the required fields from the internal master document in one or more output graphical user interfaces (GUIs) in user-editable formats.

10. The document processing system of claim 9, the processor-executable instructions for resolving the discrepancy comprise instructions that cause the processor to:
receive user edits to at least one of the required fields;
upload the user edits to the external knowledge base; and
provide the user edits as training data to the document processing system.

11. A document processing method comprising:
receiving a request including an intent pertaining to an automated execution of a billing task, the request includes at least one document required for the automated execution of the task;
determining the intent of the request by:
parsing and tokenizing the request and the at least one document;
identifying from the tokens, data indicative of the intent for the automated execution of the task;
obtaining additional pertinent information required for the automated execution of the task, the additional information being obtained from an external knowledge base using a billing domain model, the billing domain model including terms related to medical billing domain;
identifying at least one discrepancy in the document and the additional pertinent information based on process rules;
automatically resolving the discrepancy using at least the billing domain model, and
if the discrepancy cannot be automatically resolved, manually resolving the discrepancy;
generating an internal master document that collates information relevant to the task from the document, the billing domain model and the external knowledge base;
providing the internal master document for review and approval to a user; and
enabling the automatic execution of the task upon the user review and approval of the internal master document.

12. The method of claim 11, wherein the automatic execution of the task further comprises:
generating another request for the automatic execution of the task in accordance with the process rules and based at least on the internal master document.

13. The method of claim 11, wherein generating the internal master document further comprises:
generating the internal master document as a text file including the collated information.

14. The method of claim 11, wherein providing the internal master document for review and approval to the user further comprises:
provinding, via an output graphical user interface (GUI), portions of the internal master document for the user review and approval.

15. The method of claim 14, wherein providing the portions of the internal master document for the user review and approval further comprises:
providing, a respective switch for each of the portions, wherein a state of the switch is automatically toggled upon the approval of the portion by the user.

16. The method of claim 11, wherein the billing domain model is based on neural networks.

17. A non-transitory storage medium comprising machine-readable instructions that cause at least one processor to:
receive a request with information related to a process to be automatically executed;
extract the information for the automatic execution of the process,
the information being extracted from at least two documents of different document formats and associated with the process, and
the information being extracted based on a domain model;
identify an intent conveyed within the information,
the intent enabling identification of the process, and
the intent being determined based at least on textual processing techniques and natural language processing (NLP);
obtain one or more required fields for automatic execution of the process from the at least two documents;
determine if one or more discrepancies exist in the required fields based on a comparison of values contained in the required fields;
build an internal master document based on validation of the one or more required fields, and the internal master document enabling automatic execution of the process if no discrepancies are detected;
resolve the discrepancy if at least one discrepancy is detected;
generate an internal master document with at least one false positive value;
present the internal master document to a user for review and approval; and
generate a report based on the user's review of the internal master document.

18. The non-transitory storage medium of claim 17, wherein the machine-readable instructions for generating the report further comprise instructions that cause at least one processor to:
receive an erroneous response in the user's review of the internal master document; and
generate a report for further training of the user based on a comparison of the erroneous user response with responses from other users to the false positive value.

19. The non-transitory storage medium of claim 17, wherein the machine-readable instructions for generating the report further comprise instructions that cause at least one processor to:
receive an erroneous response in the user's review of the internal master document; and
generate a report for further changes to the internal master document based on a comparison of the erroneous user response with responses from other users to the false positive value.

20. The non-transitory storage medium of claim 17, wherein the machine-readable instructions for generating the internal master document further comprise instructions that cause at least one processor to:
include the extracted information in the internal master document; and
generate the internal master document as a text file.

* * * * *